US008441395B2

(12) United States Patent
Kanamoto

(10) Patent No.: US 8,441,395 B2
(45) Date of Patent: May 14, 2013

(54) ELECTRONIC SCANNING RADAR APPARATUS, RECEIVING WAVE DIRECTION ESTIMATING METHOD, AND COMPUTER-READABLE STORAGE MEDIA STORING RECEIVING WAVE DIRECTION ESTIMATION PROGRAM

(75) Inventor: Junji Kanamoto, Hadano (JP)

(73) Assignee: Honda Elesys Co., Ltd., Kanagawa-Ken (JP)

( * ) Notice: Subject to any disclaimer, the term of this patent is extended or adjusted under 35 U.S.C. 154(b) by 330 days.

(21) Appl. No.: 12/977,605

(22) Filed: Dec. 23, 2010

(65) Prior Publication Data

US 2011/0156947 A1    Jun. 30, 2011

(30) Foreign Application Priority Data

Dec. 25, 2009    (JP) ................................ P2009-296081

(51) Int. Cl.
*G01S 13/00* (2006.01)
*G01S 13/58* (2006.01)

(52) U.S. Cl.
USPC ............................ 342/107; 342/147; 342/149

(58) Field of Classification Search .............. 342/70–72, 342/107, 113, 147, 149–154
See application file for complete search history.

(56) References Cited

U.S. PATENT DOCUMENTS

| 6,498,581 | B1 * | 12/2002 | Yu ................................... | 342/90 |
| 6,567,034 | B1 * | 5/2003 | Yu ................................... | 342/16 |
| 7,474,252 | B2 * | 1/2009 | Natsume et al. ................ | 342/70 |
| 7,495,605 | B1 * | 2/2009 | Sakamoto et al. ............. | 342/118 |
| 7,724,181 | B2 * | 5/2010 | Natsume ......................... | 342/108 |
| 7,907,083 | B2 * | 3/2011 | Sakamoto et al. .............. | 342/70 |
| 8,102,309 | B2 * | 1/2012 | Nakagawa ..................... | 342/147 |
| 8,232,914 | B2 * | 7/2012 | Kuroda et al. ................. | 342/129 |
| 2001/0015698 | A1 * | 8/2001 | Tokoro ............................ | 342/70 |
| 2003/0085835 | A1 * | 5/2003 | Matsui et al. ................... | 342/70 |

(Continued)

FOREIGN PATENT DOCUMENTS

| JP | 2006-275840 A | 10/2006 |
| JP | 2007-040806 A | 2/2007 |
| JP | 2009-156582 A | 7/2009 |

OTHER PUBLICATIONS

"MATLAB Multi-media Signal Processing part I: Digital signal fundamentals" 2004, Ikehara and Shimamura by Baifukan Co., Ltd.
"Adaptive Signal Processing Using Array Antennas", 1998, pp. 173-174, Kikuma Nobuyoshi, Kagaku Gijutsu Shyuppan.

*Primary Examiner* — Jack W Keith
*Assistant Examiner* — Peter Bythrow
(74) *Attorney, Agent, or Firm* — Arent Fox LLP

(57) ABSTRACT

An electronic scanning radar apparatus includes a transmission unit configured to transmit a transmission wave, a receiving unit including a plurality of antennas receiving an incoming wave coming from a target, a beat signal generation unit configure to generate beat signals in response to the transmission wave and the incoming wave, a frequency resolution processing unit obtaining complex number data calculated from beat frequencies having signal levels obtained by performing a frequency resolution for the beat signals based on a predetermined frequency width, a peak detector detecting an existence of a present target by detecting peak signal levels of the beat frequencies, a target link unit associating between the present target detected in a present detecting cycle and a past target detected in past detecting cycles; and a direction detecting unit calculating a direction of the incoming wave based on the weighted averaging process.

18 Claims, 31 Drawing Sheets

U.S. PATENT DOCUMENTS

| | | | |
|---|---|---|---|
| 2003/0112173 A1* | 6/2003 | Seki et al. | 342/70 |
| 2004/0183713 A1* | 9/2004 | Kumon et al. | 342/70 |
| 2006/0220945 A1* | 10/2006 | Ohtake et al. | 342/70 |
| 2009/0040097 A1* | 2/2009 | Sakamoto et al. | 342/118 |
| 2009/0073026 A1* | 3/2009 | Nakagawa | 342/107 |
| 2009/0085796 A1* | 4/2009 | Kuroda et al. | 342/129 |
| 2009/0309784 A1* | 12/2009 | Natsume | 342/189 |
| 2010/0073216 A1* | 3/2010 | Sakamoto et al. | 342/70 |

* cited by examiner

FIG. 5

PEAK DURING ASCENT →

PEAK DURING DESCENT ↓

|   | 1 | 2 | 3 | 4 | 5 |
|---|---|---|---|---|---|
| 1 | $r_{11}$<br>$v_{11}$<br>$pu_1$<br>$pd_1$ | $r_{12}$<br>$v_{12}$<br>$pu_2$<br>$pd_2$ | ... |  |  |
| 2 | $r_{21}$<br>$v_{21}$<br>$pu_1$<br>$pd_2$ | $r_{22}$<br>$v_{22}$<br>$pu_2$<br>$pd_2$ |  |  |  |
| 3 | ... |  | ... |  |  |
| 4 |  |  |  |  |  |
| 5 |  |  |  |  | $r_{55}$<br>$v_{55}$<br>$pu_5$<br>$pd_5$ |

AFTER DBF, THIS MATRIX WILL BE CREATED FOR THE NUMBER OF ANGLES CH

FIG. 6

| TARGET GROUP NUMBER | DISTANCE | RELATIVE VELOCITY | FREQUENCY POINT |
|---|---|---|---|
| TARGET GROUP NUMBER 1 | $r_1$ | $v_1$ | $f_1$ |
| TARGET GROUP NUMBER 2 | $r_2$ | $v_2$ | $f_2$ |
| TARGET GROUP NUMBER 3 | $r_3$ | $v_3$ | $f_3$ |
| TARGET GROUP NUMBER 4 | $r_4$ | $v_4$ | $f_4$ |
| ⋮ |  |  |  |

FIG. 10

|  |  | t(GROUP) | t(ESTIMATION) | t−1 | t−2 | t−3 |
|---|---|---|---|---|---|---|
| TARGET 1 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | AR_C_up |  |  |  |  |  |
|  | f_dwn |  |  |  |  |  |
|  | AR_C_dwn |  |  |  |  |  |
| TARGET 2 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | AR_C_up |  |  |  |  |  |
|  | f_dwn |  |  |  |  |  |
|  | AR_C_dwn |  |  |  |  |  |
| ⋮ | ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : PEAK FREQUENCY DURING ASCENT
AR_C_up : AR COEFFICIENT AT PEAK FREQUENCY DURING ASCENT
f_dwn : PEAK FREQUENCY DURING DESCENT
AR_C_dwn : AR COEFFICIENT AT PEAK FREQUENCY DURING DESCENT

FIG. 15

| | | t (GROUP) | t(ESTIMATION) | t−1 | t−2 | t−3 |
|---|---|---|---|---|---|---|
| TARGET 1 | r | | | | | |
| | Long_d | | | | | |
| | Late_d | | | | | |
| | velo | | | | | |
| | f_up | | | | | |
| | mat_up | | | | | |
| | AR_C_up | | | | | |
| | vr_up | | | | | |
| | f_dwn | | | | | |
| | mat_dwn | | | | | |
| | AR_C_dwn | | | | | |
| | vr_dwn | | | | | |
| TARGET 2 | r | | | | | |
| | Long_d | | | | | |
| | Late_d | | | | | |
| | velo | | | | | |
| | f_up | | | | | |
| | mat_up | | | | | |
| | AR_C_up | | | | | |
| | vr_up | | | | | |
| | f_dwn | | | | | |
| | mat_dwn | | | | | |
| | AR_C_dwn | | | | | |
| | vr_dwn | | | | | |
| ⋮ | ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : PEAK FREQUENCY DURING ASCENT
mat_up : COVARIANCE MATRIX DURING ASCENT
AR_C_up : AR COEFFICIENT AT PEAK FREQUENCY DURING ASCENT
vr_up : RIGHT HAND SIDE VECTOR DURING ASCENT
f_dwn : PEAK FREQUENCY DURING DESCENT
mat_dwn : COVARIANCE MATRIX DURING DESCENT
AR_C_dwn : AR COEFFICIENT AT PEAK FREQUENCY DURING DESCENT
vr_dwn : RIGHT HAND SIDE VECTOR DURING DESCENT

FIG. 19

|  |  | t (GROUP) | t (ESTIMATION) | t-1 | t-2 | t-3 |
|---|---|---|---|---|---|---|
| TARGET 1 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | x_up |  |  |  |  |  |
|  | AR_C_up |  |  |  |  |  |
|  | f_dwn |  |  |  |  |  |
|  | x_dwn |  |  |  |  |  |
|  | AR_C_dwn |  |  |  |  |  |
| TARGET 2 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | x_up |  |  |  |  |  |
|  | AR_C_up |  |  |  |  |  |
|  | f_dwn |  |  |  |  |  |
|  | x_dwn |  |  |  |  |  |
|  | AR_C_dwn |  |  |  |  |  |
| ⋮ | ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : PEAK FREQUENCY DURING ASCENT
x_up : COMPLEX NUMBER DATA DURING ASCENT
AR_C_up : AR COEFFICIENT AT PEAK FREQUENCY DURING ASCENT
f_dwn : PEAK FREQUENCY DURING DESCENT
x_dwn : COMPLEX NUMBER DATA DURING DESCENT
AR_C_dwn : AR COEFFICIENT AT PEAK FREQUENCY DURING DESCENT

FIG. 22

|  |  | t (GROUP) | t(ESTIMATION) | t−1 | t−2 | t−3 |
|---|---|---|---|---|---|---|
| TARGET 1 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | AR_C_up |  |  |  |  |  |
|  | f_dwn |  |  |  |  |  |
|  | AR_C_dwn |  |  |  |  |  |
| TARGET 2 | r |  |  |  |  |  |
|  | Long_d |  |  |  |  |  |
|  | Late_d |  |  |  |  |  |
|  | velo |  |  |  |  |  |
|  | f_up |  |  |  |  |  |
|  | AR_C_up |  |  |  |  |  |
|  | f_dwn |  |  |  |  |  |
|  | AR_C_dwn |  |  |  |  |  |
| ⋮ | ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : PEAK FREQUENCY DURING ASCENT
AR_C_up : AR COEFFICIENT AT PEAK FREQUENCY DURING ASCENT
f_dwn : PEAK FREQUENCY DURING DESCENT
AR_C_dwn : AR COEFFICIENT AT PEAK FREQUENCY DURING DESCENT

FIG. 23A

ASCENT

| | ANGLE 1 | ANGLE 2 | ... | FREQUENCY POINT |
|---|---|---|---|---|
| TARGET GROUP NUMBER 1 | $t_1\_ang_1$ | $t_1\_ang_2$ | | $f_1$ |
| TARGET GROUP NUMBER 2 | $t_2\_ang_1$ | $t_2\_ang_2$ | | $f_2$ |
| TARGET GROUP NUMBER 3 | $t_3\_ang_1$ | $t_3\_ang_2$ | | $f_3$ |
| TARGET GROUP NUMBER 4 | $t_4\_ang_1$ | $t_4\_ang_2$ | | $f_4$ |
| ⋮ | | | | |

FIG. 23B

DESCENT

| | ANGLE 1 | ANGLE 2 | ... | FREQUENCY POINT |
|---|---|---|---|---|
| TARGET GROUP NUMBER 1 | $t_1\_ang_1$ | $t_1\_ang_2$ | | $f_1$ |
| TARGET GROUP NUMBER 2 | $t_2\_ang_1$ | $t_2\_ang_2$ | | $f_2$ |
| TARGET GROUP NUMBER 3 | $t_3\_ang_1$ | $t_3\_ang_2$ | | $f_3$ |
| TARGET GROUP NUMBER 4 | $t_4\_ang_1$ | $t_4\_ang_2$ | | $f_4$ |
| ⋮ | | | | |

FIG. 25

| TARGET GROUP NUMBER | VERTICAL DISTANCE | VERTICAL POSITION | LATERAL POSITION | RELATIVE VELOCITY | FREQUENCY POINT |
|---|---|---|---|---|---|
| TARGET GROUP NUMBER 1 | $r_1$ | $long\_d_1$ | $late\_d_1$ | $v_1$ | $f_1$ |
| TARGET GROUP NUMBER 2 | $r_2$ | $long\_d_2$ | $late\_d_2$ | $v_2$ | $f_2$ |
| TARGET GROUP NUMBER 3 | $r_3$ | $long\_d_3$ | $late\_d_3$ | $v_3$ | $f_3$ |
| TARGET GROUP NUMBER 4 | $r_4$ | $long\_d_4$ | $late\_d_4$ | $v_4$ | $f_4$ |
| ⋮ | | | | | |

FIG. 30

| | | t (GROUP) | t(ESTIMATION) | t-1 | t-2 | t-3 |
|---|---|---|---|---|---|---|
| TARGET 1 | r | | | | | |
| | Long_d | | | | | |
| | Late_d | | | | | |
| | velo | | | | | |
| | f_up | | | | | |
| | mat_up | | | | | |
| | vr_up | | | | | |
| | f_dwn | | | | | |
| | mat_dwn | | | | | |
| | vr_dwn | | | | | |
| TARGET 2 | r | | | | | |
| | Long_d | | | | | |
| | Late_d | | | | | |
| | velo | | | | | |
| | f_up | | | | | |
| | mat_up | | | | | |
| | vr_up | | | | | |
| | f_dwn | | | | | |
| | mat_dwn | | | | | |
| | vr_dwn | | | | | |
| ⋮ | ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : PEAK FREQUENCY DURING ASCENT
mat_up : COVARIANCE MATRIX DURING ASCENT
vr_up : RIGHT HAND SIDE VECTOR DURING ASCENT
f_dwn : PEAK FREQUENCY DURING DESCENT
mat_dwn : COVARIANCE MATRIX DURING DESCENT
vr_dwn : RIGHT HAND SIDE VECTOR DURING DESCENT

ELECTRONIC SCANNING RADAR APPARATUS, RECEIVING WAVE DIRECTION ESTIMATING METHOD, AND COMPUTER-READABLE STORAGE MEDIA STORING RECEIVING WAVE DIRECTION ESTIMATION PROGRAM

BACKGROUND OF THE INVENTION

1. Field of the Invention

The present invention relates to an electronic scanning radar apparatus, a receiving wave direction estimating method, and a computer-readable storage media storing a receiving wave direction estimation program. More particularly, the present invention relates to an electronic scanning radar apparatus being preferable to be equipped in a moving body, a receiving wave direction estimating method, and a computer-readable storage media storing a receiving wave direction estimation program, in which the electronic scanning radar apparatus transmits a transmission wave to a target so as to detect the target by receiving a reflection wave of the transmission wave reflected from the target.

Priority is claimed on Japanese Patent Application No. 2009-296081, filed Dec. 25, 2009, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In general, an electronic scanning radar apparatus is known as radar to be equipped for a moving body. For such radar, a frequency modulated continuous wave (FMCW) radar, multiple-frequency continuous wave radar, pulse radar or the like is employed.

For each radar described above, a receiving wave direction estimating method with array antennas is used for detecting the direction of a receiving wave from a target. The receiving wave may be referred to as an incoming wave, and the target may be referred to as a reflecting object.

Recently, the receiving wave direction estimating method employs highly accurate algorithms such as an auto regressive spectral estimation method (AR spectral estimation method; see FIG. 34), a multiple signal classification method (MUSIC method) or the like, which can provide high resolution (high accuracy) of the direction of receiving waves without increasing channels of receiving antennas. These methods are described in Japanese Unexamined Patent Application, First Publication, Nos. 2006-275840, 2007-40806 and 2009-156582, and also described in "MATLAB Multi-media Signal Processing part I: Digital signal fundamentals" published by Ikehara and Shimamura in 2004 by BAIFUKAN CO., LTD., and also described in "Adaptive Signal Processing with Array Antennas" published by Kikuma in 1998 by Kagaku Shuppan Co. LTD.

The AR spectral estimation method is also referred to as a maximum entropy method (MEM) or a linear prediction method.

For estimating the direction of receiving waves from a target (reflecting object) with those algorithms, input data indicated by complex numbers are converted into a matrix form called as a correlation matrix, and then the estimation process is performed.

Furthermore, in the receiving wave direction estimating method equipped in a moving body, a detecting process is repeatedly performed in detecting cycles (control cycles). Correlation matrixes obtained in previous (past) detecting cycles are stored in a memory (or a data storage device) as past correlation matrixes so that an averaging (or addition) process is performed between the present correlation matrix obtained by the present (latest) detecting cycle and the past correlation matrixes. Thereby, the direction estimation process is performed. See Japanese Unexamined Patent Application, First Publication, Nos. 2007-40806 and 2009-156582. This averaging process of the correlation matrixes can reduce noise factors, so that the accuracy of the receiving wave direction estimation is improved.

When a number of channels used for an array process is decreased, the accuracy of the estimation is reduced even if a highly accurate algorithm is used, because the number of data sets (data) becomes insufficient for an accurate estimation. Namely, when the number of data sets becomes insufficient, it becomes difficult to treat the receiving signals as ideal sine waves. This influences the results of correlation processes. For this problem, it is expected to obtain significant effects for improving the accuracy of the detection of the target by performing the averaging process between the correlation matrixes.

Japanese Unexamined Patent Application, First Publication, No. 2007-40806, describes that the correlation matrixes must be stored in the memory (or storage device) as information that corresponds to the whole distance (frequency) points. This requires a mass storage device (or large capacity memory) when the detection range is expanded or the detection accuracy is improved. The past correlation matrixes have beat frequencies that correspond to those of the present correlation matrix. This condition provides proper averages for detecting the direction of the target as long as the electronic scanning radar apparatus follows the target with a constant distance. However, when the distance between the electronic scanning radar apparatus and the target is varied, there is a possibility that the beat frequency of the present correlation matrix does not correspond to those of the past correlation matrixes. This could degrade the data used for detecting the direction of the target.

The present invention takes into consideration the issues described above. One of the objects of this invention is to provide an electronic scanning radar apparatus, a receiving wave direction estimating method, and a computer-readable storage media storing a receiving wave direction estimation program, which make it possible to accurately detect the direction of receiving (incoming) waves from the target while maintaining the accuracy of the signal detections.

In view of the above, it will be apparent to those skilled in the art from this disclosure that there exists a need for an improved apparatus and/or method. This invention addresses the need in the art as well as other needs, which will become apparent to those skilled in the art from this disclosure.

SUMMARY OF THE INVENTION

Accordingly, it is a primary object of an aspect of the invention to provide an electronic scanning radar apparatus, a receiving wave direction estimating method, and a computer-readable storage media storing a receiving wave direction estimation program.

A first aspect of the invention provides an electronic scanning radar apparatus, which is installable in a moving body. The electronic scanning radar apparatus includes a transmission unit configured to transmit a transmission wave, a receiving unit including a plurality of antennas receiving an incoming wave coming from a present target, the incoming wave being formed from a reflection wave of the transmission wave reflected at the present target, a beat signal generation unit configured to generate beat signals in response to the transmission wave and the incoming wave, a frequency resolution processing unit configured to obtain complex number data calculated from beat frequencies having signal levels obtained by performing a frequency resolution for the beat signals based on a predetermined frequency width, a peak detector configured to detect an existence of the present target by detecting peak signal levels of the beat frequencies, a target link unit associating between the present target detected in a present detecting cycle and a past target detected in past detecting cycles; and a direction detecting unit configured to perform a spectral estimation based on the complex number data of the beat frequencies indicating an existence of a target, each of the beat frequencies being obtained from each of the antennas in the present detecting cycle, the direction detecting unit performing a weighted averaging process for complex number elements of a present normal equation and past normal equations, the present normal equation being obtained from a present result of the spectral estimation in the present detecting cycle, the past normal equations being obtained from past results of the spectral estimation in the past detecting cycles, the direction detecting unit calculating a direction of the incoming wave based on the weighted averaging process.

In some cases, the electronic scanning radar apparatus may include, but is not limited to, the direction detecting unit which includes a normal equation generation unit configured to generate each of the present and past normal equations based on a correlation matrix and a right hand side vector led from the complex number data, the direction detecting unit including the present and past normal equations, each of the present and past normal equations is expressed by a linear equation form, each of the present and past normal equations having complex number elements of the correlation matrix, an AR coefficient, and the right hand side vector, an AR coefficient calculation unit configured to calculate the AR coefficient based on each of the present and past normal equations, and a spectrum calculation unit configured to calculate a direction of the incoming wave based on a power spectrum calculated from the AR coefficient, wherein an averaging process is performed for at least a part of the elements of each of the normal equations.

In some cases, the electronic scanning radar apparatus may include, but is not limited to, the direction detecting unit which includes a filter unit configured to generate an averaged AR coefficient based on a weighted averaging process performing for a present AR coefficient and past AR coefficients, the present AR coefficient being calculated from the present normal equation in the present detecting cycle, the past AR coefficients being calculated from the past normal equations in the past detecting cycles, the present AR coefficient being associated with the present target, the past AR coefficients being associated with the past target, and the spectrum calculation unit calculates a direction of the incoming wave based on the power spectrum obtained from the averaged AR coefficient.

In some cases, the electronic scanning radar apparatus may include, but is not limited to, a storage unit, in which the direction detecting unit is configured to store, in the storage unit, present complex number data or the complex number elements of the present normal equation obtained based on the spectral estimation in the present detecting cycle or the direction detecting unit stores both of the present complex number data and the complex number elements of the present normal equation.

In some cases, the electronic scanning radar apparatus may includes, but is not limited to, the complex number elements of the past normal equations to be stored in the storage unit correspond to either the past AR coefficients or the past averaged AR coefficient.

In some cases, the electronic scanning radar apparatus may includes, but is not limited to, the normal equation generation unit, which is configured to generate an averaged correlation matrix based on the weighted averaging process performed for a present correlation matrix and past correlation matrixes, and generates an averaged right hand side vector based on the weighted averaging process performed for a present right hand vector and past right hand vectors, the present correlation matrix and the present right hand vector are associated with the present target, and the past correlation matrixes and the past right hand vectors are associated with the past target, the AR coefficient calculation unit calculates the AR coefficient from the normal equation having the elements including the averaged correlation matrix and the averaged right hand side vector.

In some cases, the electronic scanning radar apparatus may includes, but is not limited to, the complex number elements of the past normal equations to be stored in the storage unit correspond to the past correlation matrixes and past right hand side vectors associated with the past target.

In some cases, the electronic scanning radar apparatus may includes, but is not limited to, the target link unit, which detects whether or not each of a present distance and a present relative velocity of the present target obtained from the beat frequency in the present detecting cycle is included in ranges estimated based on a past distance and a past relative velocity of the past target obtained in the past detecting cycles so that the target link unit determines whether or not the present target associates with the past target.

In some cases, the electronic scanning radar apparatus may includes, but is not limited to, the storage unit, which stores, in the storage unit, a distance of the present target and a relative velocity of the present target detected in the present detecting cycle by associating with at least one of the present AR coefficient and the present averaged AR coefficient, the filter unit performs the weighted averaging process for the present AR coefficient and the past AR coefficients, and generates the averaged AR coefficient, the target link unit associates between the present target and the past target in a plurality of the past detecting cycles for time series, the target link unit performs an association between the present distance and the present relative velocity of the present target and the past distance and the past relative velocity of the past target, the target link unit performs another association between at least one of the present AR coefficient and the present averaged AR coefficient in the present detecting cycle and at least one of the past AR coefficients and the past averaged AR coefficient in the past detecting cycles, the target link unit stores the associations in the storage unit.

In some cases, the electronic scanning radar apparatus may includes, but is not limited to, the storage unit, which stores the complex number data of beat frequencies for one or more detecting cycles by associating with detecting cycles, when target link unit detects the present target associating with the past target, a normal equation generation unit calculates past covariance matrixes and past right hand side vectors from the complex number data in the past detecting cycles, the target link unit associates between the present target and the past target in the past detecting cycles for time series, and the normal equation generation unit performs the weighted averaging process for the present covariance matrix and past covariance matrixes, the normal equation generation unit generates weighted average covariance matrixes associated with the present and past targets in the present and past detecting cycles, the normal equation generation unit generates weighted average right hand side vectors associated with the present and past targets in the present and past detecting cycles, the target link unit stores the present distance, the present relative velocity, and the complex number data of the present target by associating with the past distance and the past relative velocity and the complex number data of the past target in the past detecting cycles.

In some cases, the electronic scanning radar apparatus may includes, but is not limited to, a digital beam forming unit detecting the existence of the present target and a present direction of the present target based on a digital beam forming method using the complex number data, in which the peak detector unit detects the present direction of the present target by performing the digital beam forming method for the beat frequencies in the present detecting cycle, the target link unit performs an association between the present distance of the present target, the present relative velocity and a present direction of the present target in the present detecting cycle and the past distance, the past relative velocity and a past direction of the past target in the past detecting cycles.

In some cases, the electronic scanning radar apparatus may includes, but is not limited to, a channel deletion unit, which is configured to calculate present spatial complex number data indicating spectrum intensities for respective angle channels corresponding to the predetermined direction preset based on the digital beam forming method, when the spectrum intensities of adjacent angle channels within a predetermined range of the angle channels exceed a predetermined threshold level, the channel deletion unit detects the existence of the target, the channel deletion unit replaces the spectrum intensities of the rest of the angle channels having the intensities less than the predetermined threshold level by a level zero, and the channel deleting unit forms the spectrum intensities as adjusted spatial complex number data; an inverse digital beam forming unit configured to perform an inverse digital beam forming process for the adjusted spatial complex number data to generate present renewed complex number data. The normal equation generation unit obtains a present correlation matrix based on the present renewed complex number data and generates another normal equation.

In some cases, the electronic scanning radar apparatus may includes, but is not limited to, the channel deletion unit, in which when the channel deletion unit detects plural targets, the channel deletion unit divides a spectrum of the plural targets into channel ranges for each of the targets and generates plural adjusted spatial complex number data for the plural targets, the inverse digital beam forming unit performs the inverse digital beam forming process for the plural adjusted spatial data and generates present renewed complex number data for each of the targets, the normal equation generation unit calculates a present correlation matrix of each of the targets based on the renewed complex number data for each of the targets.

In some cases, the electronic scanning radar apparatus may include, but is wherein not limited to, the filter unit, which varies weighted numbers of the weighted averaging process for each of the targets in response to the present relative velocity and the past relative velocity.

In some cases, the electronic scanning radar apparatus may include, but is not limited to, the filter unit, which varies weighted numbers of the weighted averaging process for each of the present and past targets when a variation of a lateral position obtained from the present and past directions and the present and past distances exceeds a predetermined lateral value.

In some cases, the electronic scanning radar apparatus may includes, but is not limited to, the target link unit which varies, in response to the present and past relative velocities, a number of the past detecting cycles for referring to information on the past detecting cycles when the target link unit performs the averaging process for the AR coefficients.

It is another aspect of the invention to provide a receiving wave direction estimating method, the method includes the method includes transmitting a transmission wave, receiving an incoming wave by a plurality of antennas, the incoming wave being formed by a reflection of the transmission wave reflected by the target, forming a beat signal from the transmission wave and the incoming wave, associating between a target detected in a present detecting cycle and the target detected in past detecting cycles, estimating a spectrum based on the complex number data of the beat frequencies indicating a detection of the existence of the target for each of the antennas in each of the detecting cycles, a normal equation being obtained from a present result of the estimation in the present detecting cycle and past results of the estimation in the past detecting cycles, and calculating a direction of the incoming wave by performing a weighted averaging process for elements of the normal equation.

It is another aspect of the invention to provide a computer-readable storage media storing a receiving wave direction estimation program for causing a computer to control an electronic scanning radar apparatus, which is installable in a moving body. The receiving wave direction estimation program includes transmitting a transmission wave, receiving an incoming wave by a plurality of antennas, the incoming wave being formed by a reflection of the transmission wave reflected by the target, forming a beat signal from the transmission wave and the incoming wave, calculating complex number data from beat frequencies obtained by performing a frequency resolution for the beat signal with a predetermined frequency width, detecting an existence of the target by detecting peak signal levels of the beat frequencies, associating between a target detected in a present detecting cycle and the target detected in past detecting cycles, estimating a spectrum based on the complex number data of the beat frequencies indicating a detection of the existence of the target for each of the antennas in each of the detecting cycles, a normal equation being obtained from a present result of the estimation in the present detecting cycle and past results of the estimation in the past detecting cycles, and calculating a direction of the incoming wave by performing a weighted averaging process for elements of the normal equation.

Thereby, since it becomes possible for the direction detecting unit to perform the averaging process for either or both of the input elements and the output elements of the spectral estimation process based on the complex number data of the detecting beat frequencies, the electronic scanning radar apparatus, the receiving wave direction estimating method, and the computer-readable storage media storing a receiving wave direction estimation program can be provided.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 5 is an illustration of a matrix of beat frequencies in the ascent and the descent at a peak combination unit 24 of FIG. 1, i.e., showing distances and relative velocities between the target and the electronic scanning radar apparatus obtained by combining the beat frequencies in the ascent and the descent;

FIG. 6 illustrates a data table that shows distances and relative velocities for every target in the present detecting cycle;

FIG. 10 is a conceptual diagram that illustrates a data table indicating a correlation matrix which lists distances and relative velocities obtained by past detecting cycles, in which the data table is used to make association between data of the present detecting cycle and those of the past detecting cycles;

FIG. 15 is a conceptual diagram that illustrates a data structure of a data table in which information is stored and retained in accordance with the third preferred embodiment of the present invention;

FIG. 19 is a conceptual diagram that illustrates a data table which information is stored and retained in accordance with the fourth preferred embodiment of the present invention;

FIG. 22 is a data table that illustrates data structure for targets obtained in the past detecting cycles, indicating such distances, vertical positions, lateral positions, and relative velocities between the targets and the electronic scanning radar apparatus;

FIG. 23A illustrates a data table that indicates angles and frequency points of the targets obtained for the ascent;

FIG. 23B illustrates a data table that indicates angles and frequency points of the targets obtained for the descent;

FIG. 25 illustrates a data table which includes data such as distances, vertical positions, lateral positions, and relative velocities, which have been determined by combination process of data peaks obtained for the ascent and the descent;

FIG. 30 is a conceptual diagram that illustrates a data table which information is stored and retained in accordance with the eighth preferred embodiment of the present invention;

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

(AR Spectral Estimation)

In the following, it will be described an autoregressive spectral estimation method (AR spectral estimation method). The AR spectral estimation method is known as a spectral estimation method, being similar to a multiple signal classification method (MUSIC method), which is shown in "MATLAB Multi-media Signal Processing part I: Digital signal fundamentals" published by Ikehara and Shimamura in 2004 by BAIFUKAN CO., LTD. The AR spectral estimation method performs an estimation process using an autoregressive model (AR model). The AR spectral estimation method is categorized as a parametric method, while MUSIC method is categorized as a subspace method. The AR spectral estimation method is also regarded as a maximum entropy method or a linear prediction method. These methods can also be categorized as a parametric method.

Figure 34:
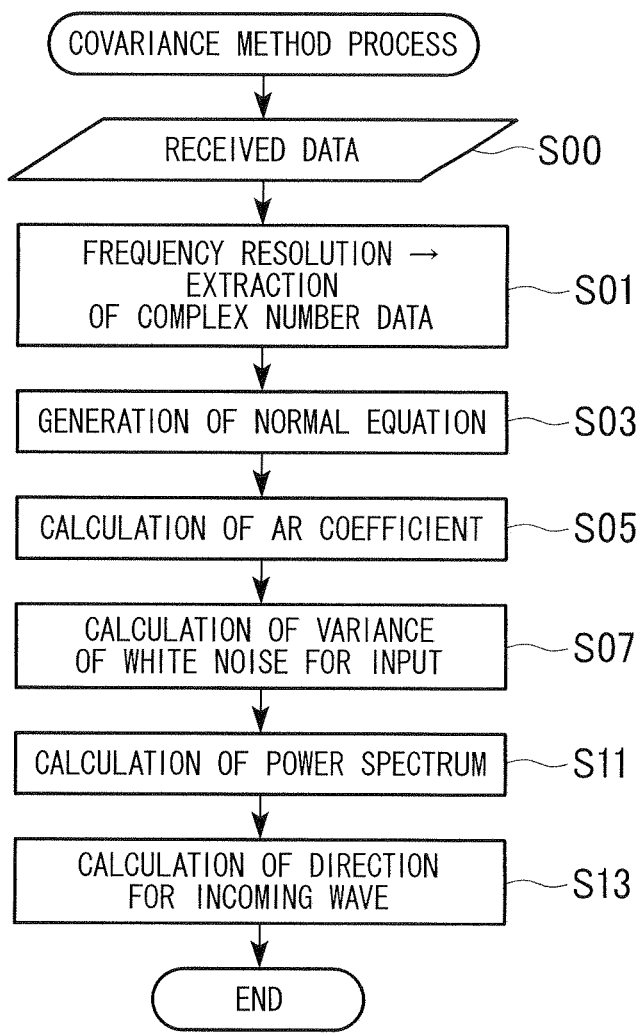
FIG. 34 is a flowchart illustrating an estimation process for AR spectrum in a related art.

In the AR spectral estimation method, it first models data using the AR model, which is described by a linear equation, and then forms a normal equation based on input data, in which the normal equation includes matrixes such as an autocorrelation matrix and a covariance matrix, and vectors such as a right hand side vector and a correlation vector. Furthermore, a coefficient of AR filter (AR coefficient) and a variance of white noise are determined based on the normal equation. Then, the AR coefficient and the variance of white noise are used to estimate a power spectrum. An example of the estimation process is shown in FIG. 34. For the input data, channel data of the spatial direction of radar according to the present invention can be used as well as time series data or the like. The AR spectral estimation method is roughly classified into a method based on the auto-correlation matrix and another method based on the covariance matrix. The auto-correlation matrix is also used in an auto-correlation method (Yule-Walker method) and a Burg method. The covariance matrix is also used in a covariance method and a modified covariance method. In any of the methods mentioned above, their algorithm generates a normal equation and obtains an AR coefficient. The preferred embodiments of the present invention can be applied to those methods.

In the following, there will be described about an electronic scanning radar apparatus (FMCW millimeter wave radar) in accordance with preferred embodiments of the present invention with reference to figures.

First Embodiment

Figure 1:
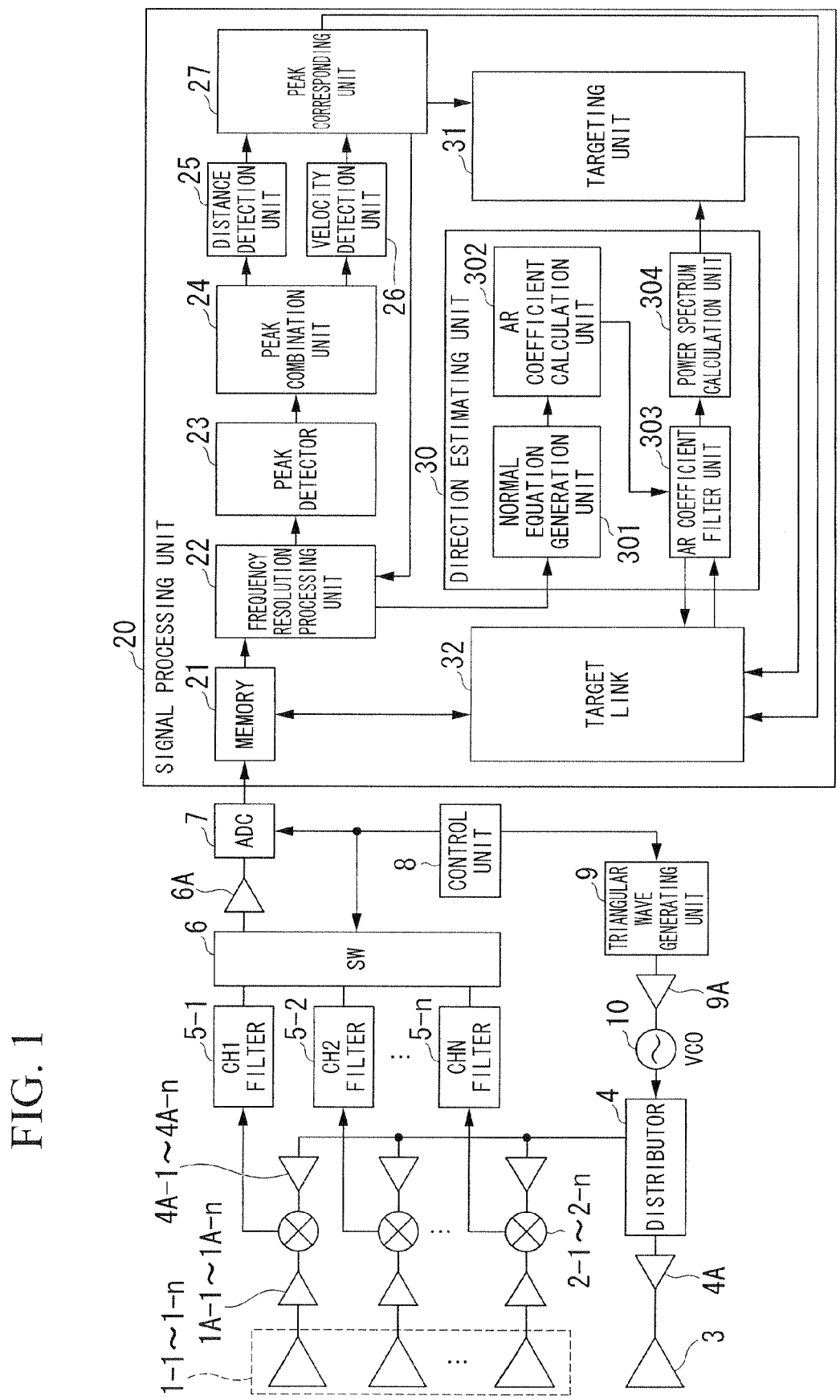
FIG. 1 is a block diagram of an electronic scanning radar apparatus in accordance with a first preferred embodiment of the present invention.

FIG. 1 is a block diagram of an electronic scanning radar apparatus in accordance with a first preferred embodiment of the present invention.

In the figure, the electronic scanning radar apparatus includes receiving antennas 1-1 through 1-$n$, mixers 2-1 through 2-$n$, a transmission antenna 3, a distributor 4, channel filters 5-1 through 5-$n$, a switching unit SW 6, an A/D convertor ADC 7, a control unit 8, a triangular wave generating unit 9, a voltage control oscillator VCO 10, and a signal processing unit 20. Further, as seen in FIG. 1, there are amplifiers 1A-1 through 1A-n, which are individually provided between the receiving antennas 1-1 through 1-$n$ and the mixers 2-1 through 2-$n$. Also there are amplifiers 4A-1 through 4A-n provided between the mixers 2-1 through 2-$n$ and the distributor 4. Each of the amplifiers 4A-1 through 4A-n is correspondingly provided to each of the mixers 2-1 through 2-$n$. Further, an amplifier 4A is provided between the transmission antenna 3 and the distributor 4. There is an amplifier 6A between the SW6 and the ADC 7. An amplifier 9A is provided between the triangular wave generating unit 9 and the VCO 10.

The signal processing unit 20 includes a memory 21, a frequency divider 22, a peak detector 23, a peak combination unit 24, a distance detection unit 25, a velocity detection unit 26, a peak corresponding unit 27, a direction estimating unit 30, a targeting unit 31, and a target link 32 (target link unit 32). In the following, the target link may be referred to as the target link unit. The direction estimating unit may be referred to as a direction detecting unit.

Further, the direction estimating unit 30 includes a normal equation generation unit 301, an AR coefficient calculation unit 302, an AR coefficient filter unit 303, and a power spectrum calculation unit 304.

With reference to FIG. 1, the operations of the electronic scanning radar apparatus in accordance with the present embodiment is described below.

The receiving antennas 1-1 through 1-$n$ receive incoming waves which come from a target. After the transmission antennas 3 transmits a transmission wave toward the target, a reflection wave is formed at the target by reflection of the transmission wave, and the reflection wave is received by the receiving antennas 1-1 through 1-$n$ as receiving waves. The receiving waves may be referred to as incoming waves.

The receiving waves are respectively amplified through the amplifiers 1A-1 through 1A-n after being received by the receiving antennas 1-1 through 1-$n$. The amplified receiving waves (signals) are mixed at the mixers 2-1 through 2-$n$ with the transmission wave (signal) after passing through the amplifiers 4A-1 through 4A-n. Then, each of the mixers 2-1 through 2-$n$ generates a beat signal in response to a frequency difference between each of the receiving waves and the transmission wave. The beat signal is transmitted to a corresponding one of channel filters 5-1 through 5-$n$.

The triangular wave generating unit 9 generates triangular wave signals. The triangular wave signals are modulated at the voltage control oscillator VCO 10 after passing through the amplifier 9A. The transmission antenna 3 transmits the triangular wave signals toward a target (or targets) as transmission waves.

The distributor 4 distributes the transmission signal modulated at the VCO 10 to the mixers 2-1 through 2-$n$ and the transmission antennas 3.

The channel filters 5-1 through 5-$n$ correspond to channels Ch-1 through Ch-n as indicated in FIG. 1. Thus the beat signal generated by each of the mixers 2-1 through 2-$n$ corresponds to one of the channels Ch-1 through Ch-n. The channels Ch-1 through Ch-n also correspond to the receiving antennas 1-1 through 1-$n$, respectively. Each of the channel filters 5-1 through 5-$n$ performs band limitation for a beat signal in a predetermined range, and transmits a band limited beat signal to the SW6.

The control unit 8 transmits a sampling signal to the switching unit SW6. The SW6 sequentially transmits the beat signal to the beat signal to the ADC 7 in response to the sampling signal, in which the beat signal corresponds to one of the beat signals of Ch-1 through Ch-n. The beat signals of Ch-1 through Ch-n correspond to one of the receiving antennas 1-1 through 1-$n$, and are synchronized with the sampling signal.

The convertor ADC 7 converts the beat signals of Ch-1 through Ch-n into digital signals by A/D converting with synchronizing with the sampling signals. The convertor ADC 7 sequentially stores the converted digital data of the beat signals of Ch-1 through Ch-n into a waveform store area of the memory 21 in the signal processing unit 20.

The control unit 8 may be a micro computer or the like. The control 8 includes ROM (read only memory) or the like which stores a control program or the like. The electronic scanning radar apparatus shown in FIG. 1 is controlled based on the control program.

(Detection Method of Distance, Relative Velocity, and Angle (Direction))

With respect to figures, the present embodiment will be briefly described below regarding methods used to detect distances, relative velocities and angles (directions) between the electronic scanning radar apparatus and a target, in which the methods are used in the signal processing unit 20.

Figure 2A:
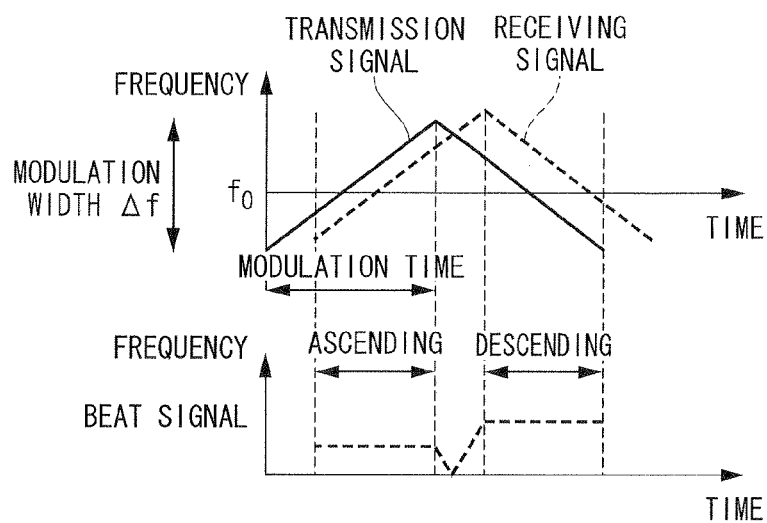
FIG. 2A and FIG. 2B are drawings showing a transmission signal and a reflecting signal reflected from a target received by the electronic scanning radar apparatus.
Figure 2B:
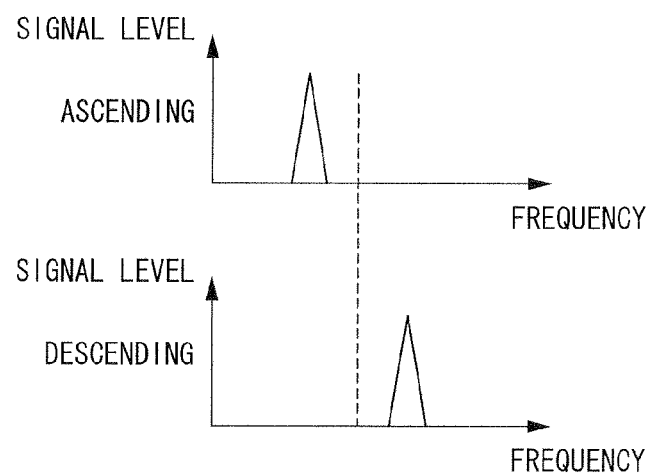

FIG. 2A and FIG. 2B are drawings showing that a transmission signal and a reflecting signal reflected from a target received by the electronic scanning radar apparatus. The figures show conditions where a transmission signal and a received signal are input into the signal processing unit 20. The received signal is caused by an incoming wave which is a reflection wave of the transmission signal reflected by the target.

In the figures, the transmission signal is formed by modulating a signal generated at the triangular wave generating unit 9. The modulation is performed using the VCO 10. The transmission signal is reflected at the target, and the reflected signal is received by the receiving antennas 1-1 through 1-n as receiving signals. In this case, it is assumed that there is a single target to be detected.

In FIG. 2A, a vertical direction indicates frequency, and a lateral direction indicates time. FIG. 2A shows a time difference between a transmission signal and a receiving signal. The receiving signal indicates a time delay compared to the transmission signal, in which the receiving signal is indicated on the right side (time-delay direction) of the transmission signal. It is also shown that there is a difference between frequencies of the transmission signal and the receiving signal. The frequency of the received signal is varied in the vertical axis (frequency direction), depending on a relative velocity of the target to the electronic scanning radar apparatus. Further, beat signals are obtained for an ascent and a descent of the transmission signal and the received signal, as indicated on down side of FIG. 2A. After a frequency transformation such as a Fourier transformation, a discrete cosine transform (DCT), a Hadamard transformation, a wavelet transformation or the like is made for the beat signals, two signal peaks are obtained for the ascent region and the descent region, respectively, as shown in FIG. 2B. In the figure, a vertical axis indicates signal levels (signal intensities), and a lateral direction indicates frequencies. Note that it is assumed that there is a single target being detected.

The data of the beat signals are sampled by synchronizing with the sampling signals. The frequency divider 22 performs frequency resolution for data of the beat signals stored in the memory 21. The frequency resolution may be performed by a Fourier transformation or the like to convert the data into frequencies for discrete time. The frequency resolution is performed for the data for the ascent and descent of the triangular wave. Namely, the frequency divider 22 performs frequency resolution for the beat signals to obtain beat frequencies having a predetermined frequency bandwidth. Then, the frequency divider 22 calculates complex number data based on the beat signals which are resolved as a function of the beat frequencies. The complex number data may be referred as to data of complex numbers.

As a result, the signal levels can be obtained for each of the beat frequencies at each of the ascent and the descent as shown in FIG. 2B.

The peak detector 23 detects signal peaks of the signal levels for the beat frequencies as indicated in FIG. 2B, and detects whether the target exists or not. Further, the peak detector 23 transmits the beat frequencies of the signal peaks for the ascent and the descent to the peak combination unit 24 as target frequencies.

The distance detection unit 25 receives a target frequency fu at the ascent and a target frequency fd at the descent from the peak combination unit 24. After receiving the target frequency fu and the target frequency fd from the peak combination unit 24, the distance detection unit 25 calculates the distance of the target based on the following equation, $$r = \{C \cdot T/2 \cdot \Delta f\} \cdot \{(fu+fd)/2\}$$

where
  C: speed of light
  $\Delta f$: modulation frequency bandwidth of a triangular wave
  T: modulation time for an ascent or a descent (See FIG. 2A)
  fu: target frequency at the ascent
  fd: target frequency at the descent.

After receiving the target frequency fu and the target frequency fd from the peak combination unit 24, the velocity detection unit 26 calculates the relative velocity v using the equation below, $$v = \{C/2 \cdot f0\} \cdot \{(fu-fd)/2\}$$

where
  f0: center frequency of a triangular wave.

In the following, there will be described about the receiving antennas 1-1 through 1-n.

Figure 3:
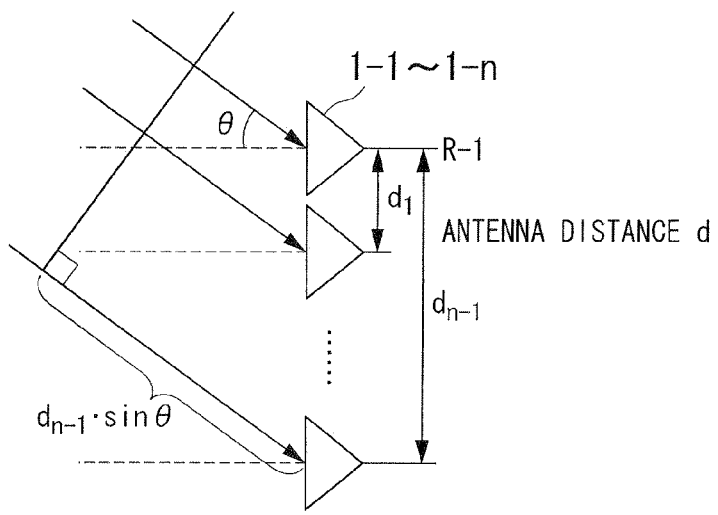
FIG. 3 is a view of array antennas showing how waves are received by the antennas.

FIG. 3 is a view of array antennas showing how waves are received by the antennas 1-1 through 1-n.

The receiving antennas 1-1 through 1-n are provided with an arrayed structure having a antenna distance d as shown in FIG. 3. The receiving antennas 1-1 through 1-n receive incoming waves from the target. The incoming waves may be referred to as receiving waves, and also the incoming waves are referred to as incident waves. The incoming waves are reflection waves, which are formed by the transmission waves from the transmission antenna 3 being reflected at the target. The reflection waves are received by the receiving antennas 1-1 through 1-n at an angle θ. The angle θ is the angle between an incident angle of the reflection waves and a direction normal to the surface of the arraigned antennas.

The incoming waves are received by the receiving antennas 1-1 through 1-n at the same angle θ.

A phase difference occurs between each of neighboring receiving antennas 1-1 through 1-n for an angle θ and an antenna distance d as indicated in FIG. 3. The antenna distance is measured from a reference position R-1. In this figure, the position of the antenna 1-1 is assigned as the reference position R-1 as an example. The phase difference is expressed by "$d_{n-1} \cdot \sin \theta$" for the given angle θ and the given distance d between neighboring antennas.

The phase difference can be used to detect the angle θ by signal processing. The incoming (receiving) waves are received by the receiving antennas as receiving signals. The signal processing is carried out using such a digital beam forming (DBF) method, a high resolution algorithm or the like. Data for the signal processing are obtained by performing the frequency resolution for each of the signals of the receiving antennas 1-1 through 1-n in the time direction. The DBF method applies Fourier transformation to the obtained data in each direction of the antennas.

(Operation of Processing Unit 20 for Receiving Wave)

The memory 21 stores signal data in the wave storing area of the memory. The signal data are obtained with the receiving antennas 1-1 through 1-$n$ by the ADC7. The data are formed with the receiving signals that are converted by A/D conversion in time order (for the ascent and descent). For example, when the data sampling is performed to collect 256 data sets for the ascent and the descent respectively, the data sets to be collected will become a number of 2×256×n in total, where n indicates the number of the antennas 1-1 through 1-$n$. Then, the total number of the data sets is stored in the waveform store area of the memory 21.

The frequency divider 22 converts individual beat signals of the antennas 1-1 through 1-$n$ into frequency components by signal conversion with a predetermined resolution. Then the frequency divider 22 outputs the frequency points of the beat frequencies and the complex number data of the beat frequencies. The frequency divider 22 generates the frequency points with those complex number data for respective frequency points. The beat signals individually correspond to channels Ch-1 through Ch-n of the antennas 1-1 through 1-$n$. Fourier transformation or the like may be used for the signal conversion. For example, when 256 data sets are stored in the memory 21 by performing the data sampling for the ascent and descent for each antenna, the 256 data sets consist of 128 complex number data for the ascent and 128 complex number data for the descent. In this case, the sampled data are converted into beat frequencies indicated as the complex number data of frequency data. The number of the data sets for the whole antennas in total becomes "2×128×N (N: number of the antennas)." Further, the beat frequencies are expressed by the frequency points.

In this case, the complex number data of each antenna include a phase difference according to the angle θ. Each of the complex number data indicates an equivalent absolute value in Gaussian plane, in which the equivalent absolute value corresponds to receiving signal intensity or amplitude.

The individual intensities (or amplitudes or the like) correspond to data sets of the ascent and the descent of the triangular waves. A data set is expressed by the complex number data, so that signal intensity is obtained from the complex number data of the data set. The complex number data are calculated based on the frequency conversion of the beat signals of the triangular waves. The peak detector 23 detects the beat frequencies having peak values greater than a predetermined value. Thereby, the peak detector 23 selects the target frequency by detecting the existence of the target for respective beat frequencies. The peak values may be referred to as peak signal levels.

Therefore, the peak detector 23 forms a frequency spectrum from the complex number data of any of the antennas or forms the frequency spectrum from the whole addition of the complex number data of the whole antennas. Thereby, the peak detector 23 can detect the existence of targets based on the individual peak values of the spectrum. In other words, the peak values are regarded as the existence of the targets as a function of distance, since the distance is obtained from the beat frequencies. Further, adding the total complex number data for the whole antennas enables to average noise components, so that S/N ratio can be improved.

Figure 4A:
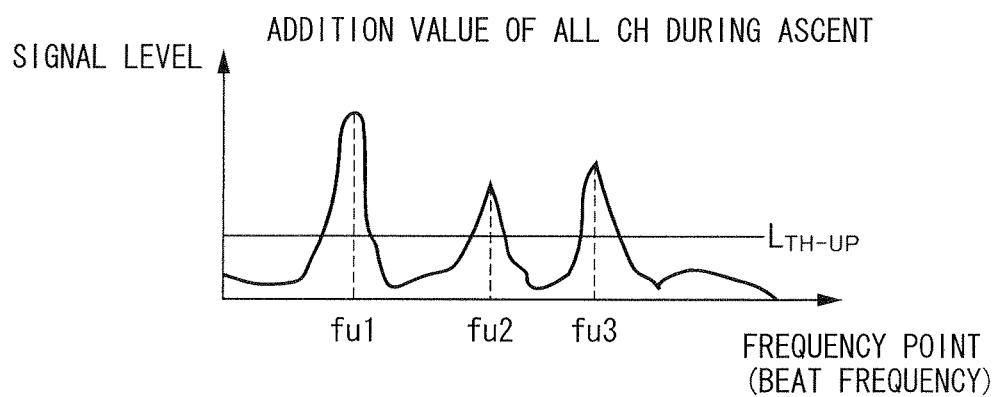
FIG. 4A and FIG. 4B are frequency analysis results showing relationships between the signal levels (vertical axis) of beat signals and the beat frequencies (horizontal axis) for an ascent and a descent, respectively.
Figure 4B:
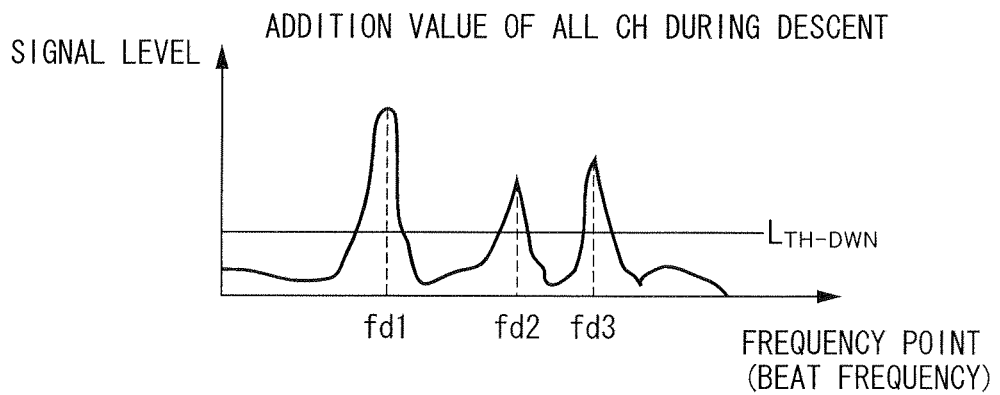

The beat frequencies (frequency points) and their peak values are indicated in FIG. 4A and FIG. 4B. FIG. 4A and FIG. 4B are frequency analysis results showing relationships between the signal levels (vertical axis) of beat signals and the beat frequencies (horizontal axis) for the ascent and the descent, respectively. A threshold level for detecting peaks at the ascent is indicated as $L_{th\text{-}up}$. Another threshold level for detecting peaks at the descent is indicated as $L_{th\text{-}dwn}$.

The peak combination unit 24 receives the beat frequencies and their peak values from the peak detector 23. The peak combination unit 24 combines the beat frequencies and their peak values at the ascent and the descent in the manner of a matrix. The matrix is formed to make a round robin combination with respect to the beat frequencies and their peak values received from the peak detector 23. Namely, the individual beat frequencies of the ascent and the descent are all combined, and sequentially transmitted to the distance detection unit 25 and the velocity detection unit 26.

The distance detection unit 25 sequentially receives the beat frequencies for the ascent and the descent from the peak combination unit 24. Numerical values are obtained by adding each of the beat frequencies for the ascent and the descent. The distance detection unit 25 calculates the distance r of a target from the numerical values.

Further, the velocity detection unit 26 calculates a relative velocity between the target and the electronic scanning radar apparatus. The relative velocity is obtained from a frequency difference between the beat frequencies for the ascent and descent, which are sequentially received from the peak combination unit 24.

FIG. 5 is an illustration of a matrix of beat frequencies in the ascent and the descent at a peak combination unit 24 of FIG. 1, showing distances and relative velocities between each of the targets and the electronic scanning radar apparatus obtained by combining the beat frequencies at the ascent and the descent.

The peak corresponding unit 27 forms a table consisting of the distance r, the relative velocity v, the peak levels pu, pd for the ascent and descent, as shown in FIG. 5. The peaks for the ascent correspond to a row direction (lateral direction), and the peaks for the descent correspond to a column direction (vertical direction). After performing the DBF method, the data table (matrix) is generated for a number of channels. The peak corresponding unit 27 determines appropriate data pair of the peaks for the ascent and descent of each target. The peak corresponding unit 27 determines the pair of peaks for the ascent and descent, and generates a data table as shown in FIG. 6. Further, the peak corresponding unit 27 determines and arranges the distances, the relative velocities by sorting grouped target numbers. Then the peak corresponding unit 27 transmits the grouped target numbers to a targeting unit 31. FIG. 6 illustrates a data table that stores distances and relative velocities and frequency points of the ascent and the descent according to the target group numbers. The tables shown in FIG. 5 and FIG. 6 are stored in an internal memory part of the peak corresponding unit 27. In this case, since the direction has not been determined for each target group, a position in a lateral direction parallel to the arranged direction of the receiving antennas 1-1 through 1-$n$ is not determined for a perpendicular axis that is perpendicular to the arranged direction of the antenna array of the electric scanning radar apparatus.

For example, the pair setting 27 may use a method that selects combinations of the target groups by taking priority over a value predicted in the present detecting cycle based on the distance r from each target and the relative velocity v finally determined in the previous detecting cycle.

Further, the target link unit 32 connects the distance r, the relative velocity v and the frequency point indicated in FIG. 6 received from the peak corresponding unit 27 with the target having been determined in the past detecting cycle stored in the memory 21, and then the target link unit 32 transmits a coefficient obtained as a result of the spectral estimation recorded in the past detecting cycles for each target to the detection estimating unit 30. The target link unit 32 attaches identification information such as the distance, the relative velocity and direction received from the targeting unit 31 to the present AR coefficient, and stores them into the memory 21.

The detection estimating unit 30 a present spectral estimation process by using a high resolution algorithm such as the AR spectral estimation process or the MUSIC method. The detection estimating unit 30 estimates a direction of the target based on a result of the averaging process performed with a past result of the spectral estimation and the result of the present spectral estimation process. The detection estimating unit 30 transmits the estimation result to the targeting unit 31.

In the following, for a spectral estimation there will be specifically described about a specific example of a procedure of an AR spectral estimation process which is known as the high resolution algorism.

In the detection estimating unit 30, a normal equation generation unit 301 generates normal equations which are necessary for the AR spectral estimation.

The normal equation generation unit 301 forms a correlation matrix obtained from the complex number data according to the beat frequencies for the ascent or the descent, or the beat frequencies for both the ascent and the descent, where the beat frequencies are obtained in terms of the frequency resolution by the frequency divider 22. The normal equation generation unit 301 generates a normal equation based on the obtained correlation matrix.

The coefficient calculation unit 302 calculates the AR coefficient obtained from the normal equation generated by the normal equation generation unit 301 and a variance $\sigma^2$ of white noise. In this way, the AR coefficient calculation unit 302 can perform, for every antenna according to detecting cycles, the spectral estimation based on the complex number data of a beat frequency of which the presence of the target has been detected.

The AR coefficient calculation unit 302 obtains a present AR coefficient by solving the normal equations which are obtained in the latest detecting cycle.

The coefficient filter 303 performs a weighted average process over the present and past AR coefficients. In this case, the coefficient filter 303 refers to coefficients obtained from the results of the spectral estimation in the past detecting cycles, in which the data of the results are recorded. The coefficients are the past AR coefficients. The coefficient filter 303 multiplies weighted coefficients to the past AR coefficients received from the target link unit 32 and the present AR coefficients respectively, and then the coefficient filter 303 performs the averaging process for those AR coefficients. The coefficient filter 303 transmits the present AR coefficient or the averaged AR coefficient to the target link unit 32. Further, the coefficient filter 303 transmits the obtained averaged AR coefficient and the variance $\sigma^2$ of the white noise to the power spectrum calculation unit 304.

The power spectrum calculation unit 304 calculates an incoming direction of the receiving wave (signal) from the power spectrum obtained based upon the averaged AR coefficient (averaged AR coefficient) and the variance $\sigma^2$ of the white noise.

(Procedure of Estimating Incoming Direction of Receiving Wave)

It will be described a procedure for estimating a coming direction of a receiving wave by the direction estimating unit 30. As an example, a description is made for an AR spectral estimation procedure which uses a high resolution algorism. Further, a modified covariance method can be applied instead of the covariance method. The fundamental procedure of the modified covariance method is the same as that of the covariance method.

The AR spectral estimation process is described in such as "MATLAB Multi-media Signal Processing part I: Digital signal fundamentals" published by Ikehara and Shimamura in 2004 by BAIFUKAN CO., LTD. For the AR spectral estimation process, explanations will be given for only parts which are necessary for describing the present embodiment.

Figure 7:
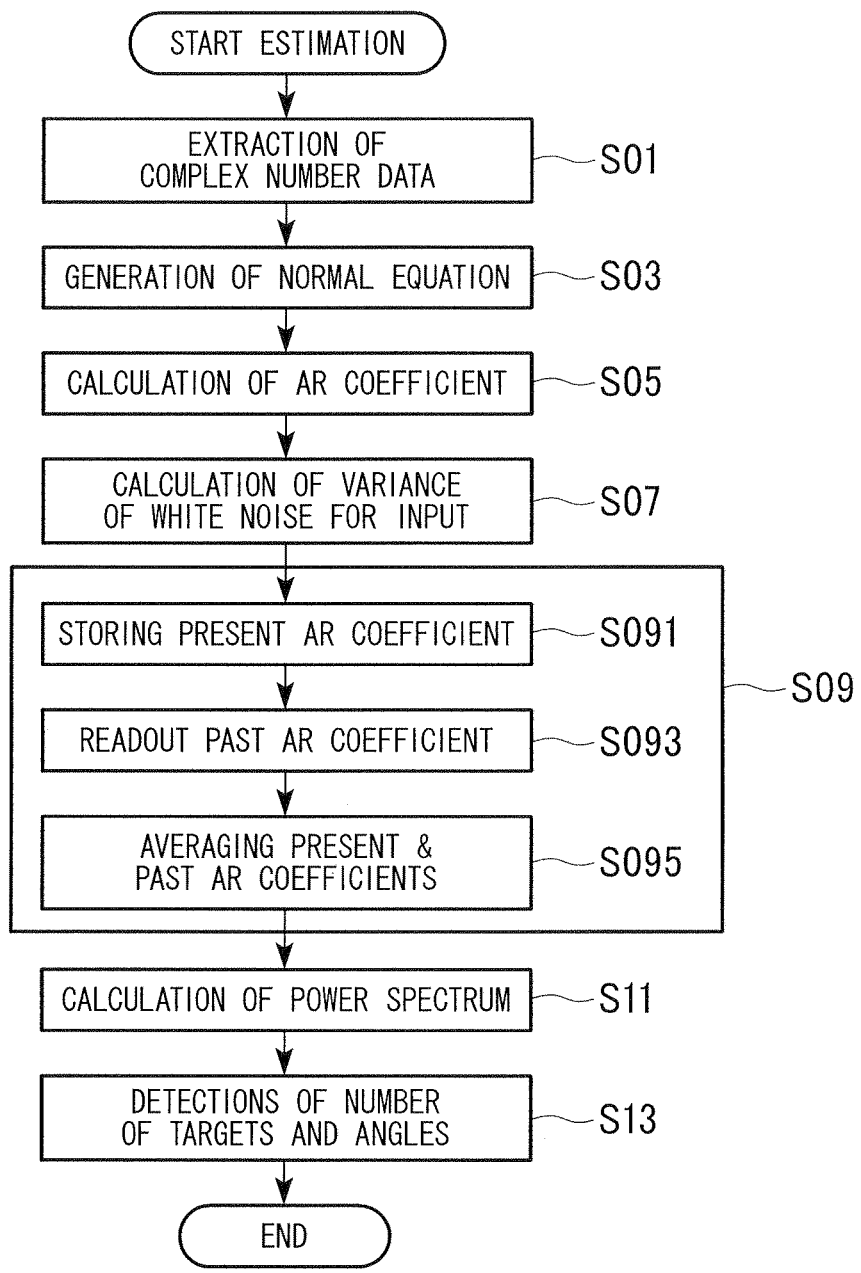
FIG. 7 is a flowchart illustrating data processing of a target direction estimation process of the electronic scanning radar apparatus.

FIG. 7 is a flowchart illustrating data processing of a target direction estimation process in the electronic scanning radar apparatus. The data processing according to the flowchart in the figure is performed periodically and repeatedly. For explaining the data processing to be repeatedly performed, a latest process cycle to be currently performed is described as a present process cycle. In this case, a past process cycle is performed prior to the latest processing. The present process cycle and the past process cycle may be referred to as the present detecting cycle and the past detecting cycle.

The frequency divider 22 extracts complex number data by using frequency resolution. The complex number data correspond to a distance point of the target (reflection object) obtained in step S01. The normal equation generation unit 301 of the direction estimating unit 30 obtains a correlation matrix based on the complex number data. The normal equation generation unit 301 generates a covariance matrix and a right hand side vector from the correlating matrix, and makes them to be complex number elements of the normal equation in step S03. In other words, the covariance matrix and the right hand side vector are led from the complex number data.

The AR coefficient calculation unit 302 solves the normal equation and obtains an AR coefficient. For a technique for solving the normal equation, a high speed algorism such as Cholesky decomposition or the like, which solves an inverse matrix at a high speed, can be used (step S05). Further, the AR coefficient calculation unit 302 can obtain a variance $\sigma^2$ of white noise in step S07.

The AR coefficient filter unit 303 receives the past AR coefficients from the target link unit 32, and receives the present AR coefficient calculated at the present detecting cycle from the AR coefficient calculation unit 302. At the AR coefficient filter unit 303, the past AR coefficients and the present AR coefficient are multiplied with those corresponding weighted factors, respectively. After the multiplications, the AR coefficient filter unit 303 performs an average process (step S09).

The detection estimating unit 30 executes the data processing in step S09 according to the following procedure.

The detection estimating unit 30 stores the AR coefficient (present AR coefficient) obtained at the present (latest) detecting cycle in a memory 21. For example, the AR coefficient filter unit 303 stores the present AR coefficient calculated by the AR coefficient calculation unit 302 into the memory 21 through the target link unit 32 (step S091). The detection estimating unit 30 calls the AR coefficient detected in the past detecting cycle (past AR coefficient). For example, the AR coefficient filter unit 303 has the target link unit 32 refer to an AR coefficient stored in the memory 21, and then receives the AR coefficient from the memory 21 through the target link unit 32.

The detection estimating unit 30 performs an averaging process between the present AR coefficient and the past AR coefficient. For example, at the AR coefficient filter unit 303, the present AR coefficient and the past AR coefficients are multiplied by respective predetermined weighted coefficients. Then, the present AR coefficient and the past AR coefficients multiplied with the respective weighted coefficients are added up. This addition procedure is equivalent to a weighted average process. An AR coefficient executed by the averaging process, which is the averaged AR coefficient, can be obtained (step S093).

Subsequently, the power spectrum calculation unit 304 obtains a power spectrum. The power spectrum is obtained based on the averaged AR coefficient and the variance $\sigma^2$ of white noise. The obtained power spectrum indicates the transfer characteristics of the AR coefficient filter unit 303. A peak characteristic is detected from the obtained power spectrum, which corresponds to a pole of a transfer function (step S11), in which the transfer characteristics are expressed by the transfer function.

An angle indicated by the peak is detected as an incoming angle (arriving angle) of the reflection wave (step S13).

In the data processing described above, the AR coefficient relates to the power spectrum characteristics and affects the accuracy of a peak shape. Thus, it is found that an increase in estimation accuracy of the AR coefficient improves the detecting characteristics (detection of an angle or separation characteristics).

(Principle of Estimation Process Using AR Model)

It will be described the detail of an estimation process of AR coefficient with reference to figures.

Figure 8:
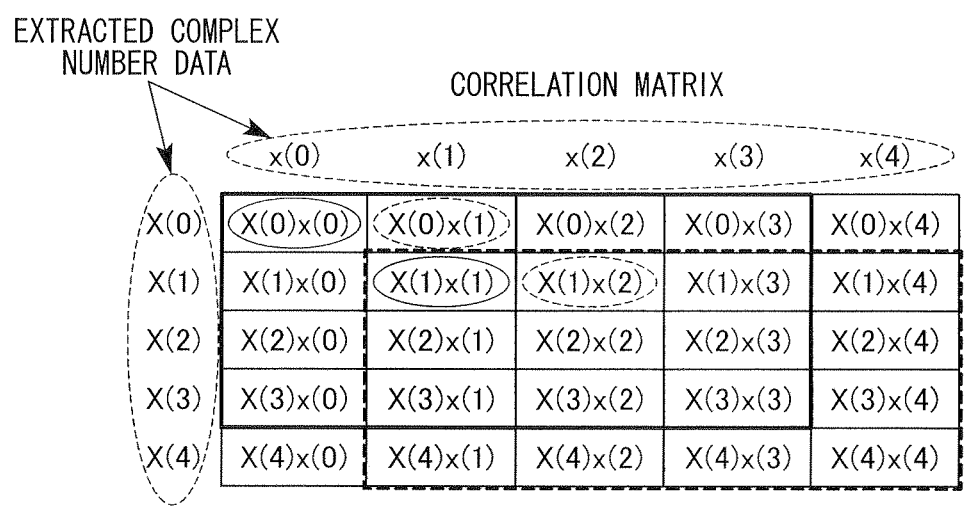
FIG. 8 is a drawing that illustrates extraction of a covariance matrix in step S03 of FIG. 7.

FIG. 8 is a drawing that illustrates extraction of a covariance matrix in step S03 of FIG. 7.

A table in the figure indicates each element of the fifth order of the correlation matrix. This table shows a five times five matrix. The elements of the five times five matrix are led from complex number data. The columns are numbered from 0 to 4, and the rows are numbered from 0 to 4.

For example, an element at the zero-th column X(0) and the zero-th row x(0) of the matrix is expressed as "X(0)x(0)", as indicated on the upper left side of the table.

For simple explanations, an example is taken for a case in which a third order covariance matrix is extracted from a fifth order correlation matrix having five rows and five columns.

The covariance matrix is divided by number of data extents for extracting the number of matrixes. The number of the matrixes to be divided is obtained by taking the order of the covariance matrix from the number of data sets. FIG. 8 shows that there are two ranges.

The first extent of extraction corresponds to the data field, ranging from X(0) to X(3) and from x(0) to x(3). The second extent of extraction corresponds to the data field, ranging from X(1) to X(4) and from x(1) to x(4). The elements of the covariance matrix are obtained by adding elements obtained from a data field where the two extraction ranges are crossed over.

A normal equation using the covariance matrix is written in equation (1).

$$C_M A = -vc, \quad (1)$$

$$C_M = \begin{bmatrix} C_x(1,1) & C_x(1,2) & \cdots & C_x(1,M) \\ C_x(2,1) & C_x(2,2) & \cdots & C_x(2,M) \\ \vdots & \vdots & \ddots & \vdots \\ C_x(M,1) & C_x(M,2) & \cdots & C_x(M,M) \end{bmatrix},$$

$$A = \begin{bmatrix} \hat{a}_M(1) \\ \hat{a}_M(2) \\ \vdots \\ \hat{a}_M(M) \end{bmatrix}, \quad vc = \begin{bmatrix} C_x(1,0) \\ C_x(2,0) \\ \vdots \\ C_x(M,0) \end{bmatrix}$$

In equation (1), the left side expresses a product of the covariance matrix $C_M$ and AR coefficient vector A. The right side is the right hand side vector vc.

The elements of the covariance matrix $C_M$ are obtained from equation (2).

$$C_x(1,1) = (x(0)x(0) + x(1)x(1))/2 \quad (2)$$
$$C_x(1,2) = (x(0)x(1) + x(1)x(2))/2$$
$$\vdots$$
$$C_x(1,M) = (x(0)x(M-1) + x(1)x(M))/2$$
$$C_x(2,1) = (x(1)x(0) + x(2)x(1))/2$$
$$\vdots$$
$$C_x(M,M) = (x(M-1)x(M-1) + x(M)x(M))/2$$

The covariance matrix $C_M$ can be expressed by a general form, as written in equation (3).

$$C_x(j,k) = \frac{1}{N-M} \sum_{n=M}^{N-1} x(n-j)x(n-k) \quad (3)$$

$$k, j = 0, 1, \ldots, M$$

In equation (3), M corresponds to the order AR model, N is the number of data sets, and x(t) is an input data.

Namely, the input data x(t) are the complex number data of the beat frequency corresponding to a frequency point.

Further, the right hand-side vector vc is written by equation (4).

$$C_x(1,0) = (x(0)x(M) + x(1)x(M+1))/2 \quad (4)$$
$$C_x(2,0) = (x(1)x(M) + x(2)x(M+1))/2$$
$$\vdots$$
$$C_x(M,0) = (x(M-1)x(M) + x(M)x(M+1))/2$$

In equation (4), the elements of the right hand-side vector vc can be led from equation (5).

$$C_x(j,k) = \frac{1}{N-M} \sum_{n=M}^{N-1} x(n-j)x(n-k) \quad (5)$$

$$k = 0, \quad j = 0, 1, \ldots, M$$

Further, the variance $\sigma_v^2$ of white nose is written by equation (6).

$$\hat{\sigma}v^2 = C_x(0,0) + \sum_{n=1}^{M} \hat{a}_M(k)C_x(0,k) \quad (6)$$

In the linear prediction method based on the AR model, this normal equation is obtained under a condition in which the averaged square error of a difference between a predicted value and an observed value becomes the minimum.

The AR coefficient can be obtained by solving the normal equation using a general solution.

Figure 9:
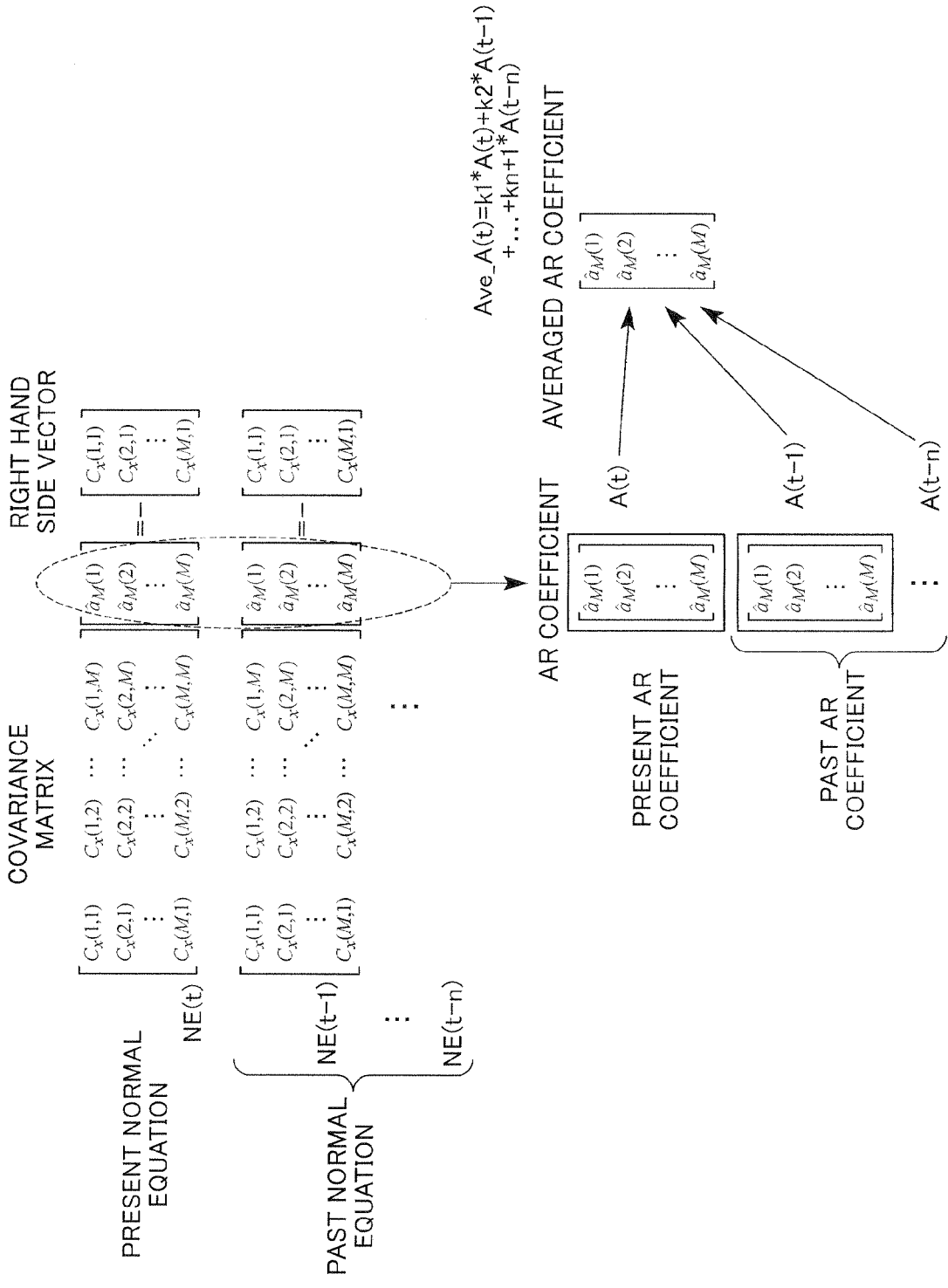
FIG. 9 is a drawing that illustrates an averaging process of AR coefficients for every detecting cycle.

FIG. 9 is a drawing that illustrates an averaging process of AR coefficients obtained for every detecting cycle.

In the figure, NE(t) indicates a normal equation at the present, which is also referred to a present normal equation. Normal equations indicated as NE(t−1) through NE(t−n) are referred to as past equations.

The present equation corresponds to a data processing which obtains an AR coefficient based on the input data which have been detected by the latest (present) estimation process, while the estimation process is being repeatedly performed. NE(t) indicates a process to be performed at time t. Also, the normal equations, which have been used to obtain their corresponding AR coefficients, are expressed in order of retroactive time (t−1), . . . , (t−n).

When AR coefficients obtained at time t, time (t−1), . . . , (t−n) are expressed as AR coefficient vectors A(t), A(t−1), . . . , A(t−n), their averaging process can be performed by addition of the vectors as expressed in equation (7). An averaging process of the elements of the complex numbers can be made by averaging their real and imaginary parts separately.

$$Ave\_A(t)=k1*A(t)+k2*A(t-1)+\ldots+kn+1*A(t-n) \qquad (7)$$

Equation (7) shows that the averaged AR coefficient, Ave_A(t), is obtained by adding the present AR coefficient A(t) and the past AR coefficients A(t−1), . . . , A(t−n), which have been obtained from n times of the past detecting cycles. The past AR coefficients A(t−1), . . . , A(t−n), are respectively weighted by set weighted coefficients $k1^*, k2^*, \ldots, k^{n+1}*$.

The method described above enables performance the averaging process of AR coefficients.

(Averaging Process at Present and Past by AR Coefficient Filter 303 of Direction Estimating Unit 30)

In the following, a description will be given of a specific procedure of averaging the present AR coefficient and the past AR coefficients in accordance with the present embodiment. This averaging process is mainly performed by the AR coefficient filter unit 303 of the direction estimating unit 30 and the target link unit 32.

FIG. 10 is a conceptual diagram that illustrates a data table indicating a correlation matrix which lists distances and relative velocities obtained by previous (past) detecting cycles. The data table is used to make data of the present detecting cycle correspond to those of the previous detecting cycles.

The target link unit 32 averages AR coefficients of the AR coefficient filter unit 303. For the table indicated in FIG. 10, the target link unit 32 performs the following process in order to associate between the present target group (t), a predicted target (t), and determined targets (t−1, t−2, t−3) for each target. The predicted target (t) is obtained from previous determined target data. The determined targets (t−1, t−2, t−3) have been previously obtained in the past.

In FIG. 10, the row of t−1 indicates a result obtained through a detecting cycle which has been performed one cycle (latest cycle) prior to the latest cycle. The rows of t−2 and t−3 indicate results obtained through detecting cycles which have been performed two and three cycles prior to the latest cycle.

As each detection result, each determined target includes data of a distance r, a longitudinal position long_d (perpendicular to the arrayed direction of the antennas), a lateral position late_d (parallel to the arrayed direction of the antennas), a relative velocity to the target velo (v), a frequency point f_dwn indicating a frequency point for the descent, an AR coefficient AR_C_dwn indicating an AR coefficient for the descent (i.e., $a_M$), which are stored in the memory 21 with the form of a table format of FIG. 10. In this figure, the example of the table area is set to be constant for convenience of explanation, while a data storing area of the AR coefficient AR_C_dwn becomes larger than the other parts of the table when the data for descent are used for detecting the direction. In this case, the long_d and late_d are obtained from the angle to the target (an incoming angle of a receiving wave) and the distance r. When the angle and the distance are denoted as θ and r respectively, the longitudinal poison long_d is given by r·cos θ, and the lateral position late_d is given by r·sin θ.

Further, the target link unit 32 preliminary predicts a distance r, a longitudinal poison long_d, a lateral position late_d, a relative velocity velo and a peak frequency point at the present detecting cycle for each target based on the previously determined distance r, determined longitudinal poison long_d, determined lateral position late_d, and determined relative velocity velo.

For example, estimations of the distance r, the longitudinal poison long_d, the lateral position late_d, the relative velocity velo and the peak frequency point are used to estimate a movable range at the time when the detecting cycle has been completed based on the previously determined the distance r, the longitudinal poison long_d, the lateral position late_d, and the relative velocity velo.

The estimation of a relative velocity can be made by calculating a change in slopes of the relative velocities or the like of some previous detecting cycles.

For example, the target link unit 32 presets a predetermined movable extent, a frequency point range, and a relative velocity range from a previously determined result, which correspond to a previously predicted distance r, a longitudinal poison long_d, a lateral position late_d, a relative velocity velo and a peak frequency point for the past detecting cycle. Then the target link unit 32 associates each of values calculated in the present detecting cycle with the predetermined movable extent, a frequency point range, and a relative velocity range, and determines if each of the values is within the predetermined ranges. If each of the values is out of a predetermined range, the target link unit 32 determines that the target is a different one.

When the target at the present detecting cycle associates with the target at the past detecting cycles in the table of FIG. 10, the target link unit 32 shifts the result of (t−2) to the result of (t−3), shifts the result of (t−1) to the result of (t−2), and shifts the present result to the result of (t−1), and then the target link unit 32 obtains an estimation result for the next detecting cycle.

Further, when there is a past target that is not associated with any of the results of the present target groups, the target link unit 32 clears all of the data of the past target.

This means that a filtering effect using the results of the past target group is to be reset when the target approaches in a distance where multipath effect is caused and it becomes a detecting cycle which does not provide a peak of the beam frequency to be detected. For the present embodiment shown in FIG. 10, the memory 21 stores the past three times' results of targets.

The target link unit 32 may be configured to maintain previous (past) determined results of targets for a predetermined number of cycles, even if there is the past target which is not associated with targets at the present detecting cycle.

Further, as stored results are updated in order, the estimation results based on the past results are also updated in order. The target link unit 32 may be configured to be able to use the past data for a number of detecting cycles more than the cycles where a peak is not detected due to a multipath effect or the like, if the target becomes associated with the past data in next or further detecting cycles, even if the target cannot be detected due to the multipath effect at the present detecting cycle.

Further, being similar to an extrapolation method of tracking control, when no peak is detected at a detecting cycle, it is still possible that the estimation result described above is used as the result of the present detecting cycle, and then an existence status of the target is maintained.

Figure 11:
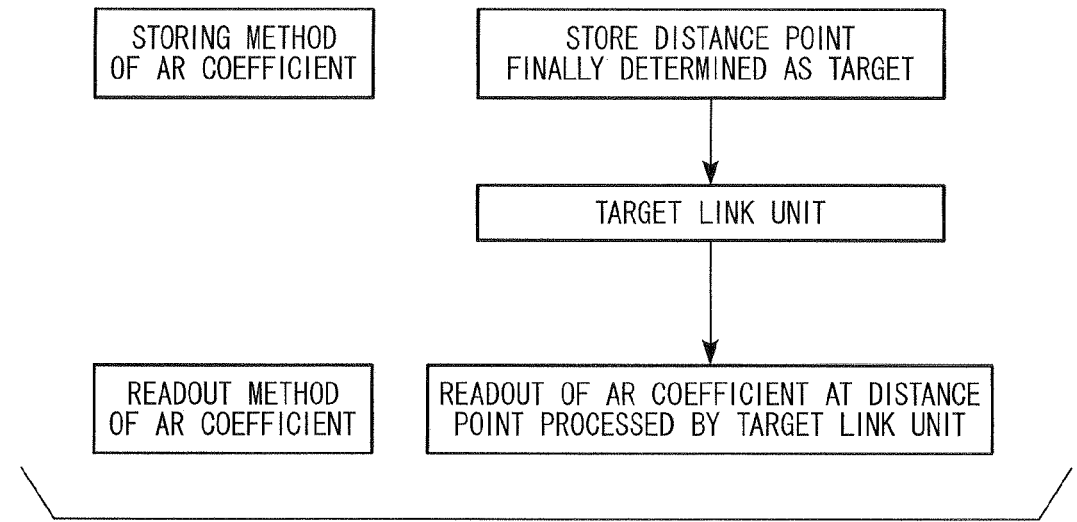
FIG. 11 is a drawing that illustrates a storing method and a read-out method of AR coefficients.

FIG. 11 is a drawing that illustrates a storing method and a read-out method of AR coefficient.

For the storing method in the figure, the target link unit 32 makes association with a distance point which is finally determined as the target. The target link unit 32 stores an AR coefficient into the memory 21.

Thereby, the direction estimating unit 30 can make association with the target by recognizing the information of a distance point as a key.

For the read-out method of AR coefficient of FIG. 11, the target link unit 32 can improve data process efficiency as an extent of estimation becomes selectable based on information of the distance point corresponding to the target which has been previously detected. The target link unit 32 estimates a next distance point with the relative velocity and the angle, and then associates them. Namely, the target link unit 32 can set limits to the extent of estimation based on the relative velocity and the angle against the target when the target link unit 32 refers stored AR coefficients. Further, in a subsequent detecting cycle, the target link unit 32 becomes to be able to select the extent of estimation based on the information of the distance point which corresponds to a previously detected target. The previously detected target may be referred to as a past target. Accordingly, the target link unit 32 can improve its process efficiency. Since the target link unit 32 can refer to the AR coefficients, which correspond to distance points in a limited range (extent), the target link unit 32 can improve the accuracy of a read-out of AR coefficients.

When the relative velocity to the target becomes greater, the variation of distance from the target for each detecting cycle becomes larger.

In this case, the beat frequency range (equivalent to the distance range) to be filtered by the AR coefficient filter unit 303 becomes larger, thus the change in the angles of connected targets becomes larger for each detecting cycle.

Figure 12A:
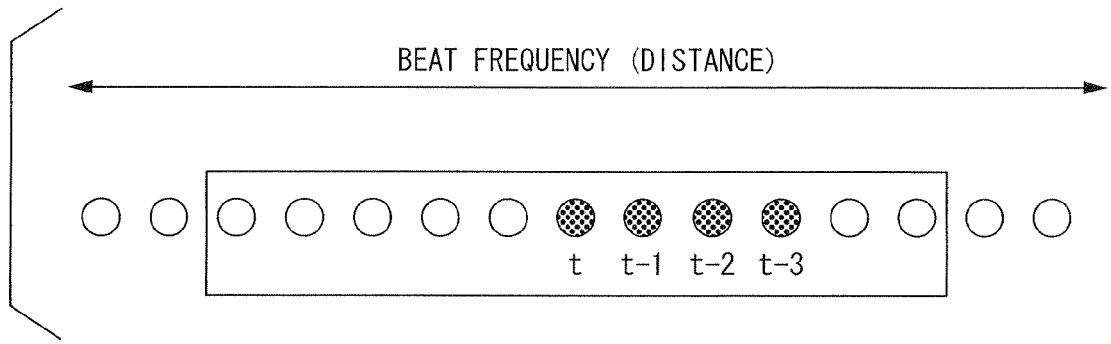
FIG. 12A and FIG. 12B are drawings that illustrate ranges of averaging data for relative velocity between the target and the electronic scanning radar apparatus, where FIG. 12A indicates a case where a target is moving at normal velocity and FIG. 12B indicates a case where the target is moving at a larger velocity.
Figure 12B:
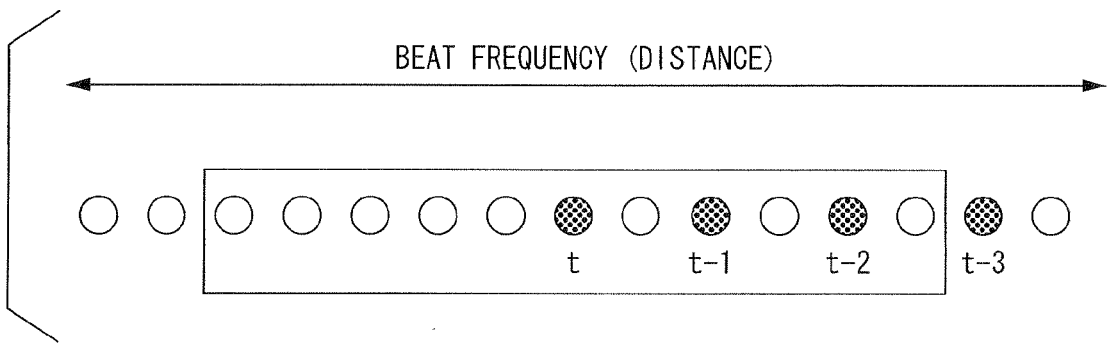

FIG. 12A and FIG. 12B are drawings that illustrate ranges of averaging data for a relative velocity between the target and the electronic scanning radar apparatus, where FIG. 12A indicates a normal velocity case and FIG. 12B indicates a larger velocity case. In the figures, the arrows in the lateral direction indicate beat frequencies which are equivalent to information relating to distances to the target. Individual spots indicate beat frequency points. The spots encompassed by a rectangular box are assumed to be a connected range of the beat frequency points. In FIG. 12A and FIG. 12B, two rectangular boxes have an identical size, being the same connection range where the beat frequency points are taken from the past t times of detecting cycles. Dark spots with notations t, t−1, t−2, and t−3 denote beat frequency points (peaks of the beat frequencies) taken at detecting cycles at t, t−1, t−2, and t−3, respectively.

As shown in the figures, when different AR coefficients of the past detecting cycles, which are obtained for an identical target, are to be associated one another, the number of the past detecting cycles is determined to be constant, so that it is possible to fix the number of past detecting cycles for storing AR coefficients. Then, it becomes possible for the number of past detecting cycles to be selectable for the averaging process, or that the number of beat frequency points to be connected is variable by adjusting the values of weighted numbers so that actual number of beat frequency points to be connected is reduced.

FIG. 12B shows an example in which the radar is approaching to the target at a higher relative velocity. In this case, as the peaks of beat frequencies move too fast, the beat frequency point at t−3 is excluded from the range of averaging data. This can be solved by properly determining a number of past detecting cycles to be used for the averaging process while maintaining the number of past detecting cycles for storing AR coefficients in the table of FIG. 10, or by modifying weighted numbers (e.g., setting the weighted number of AR coefficients to be zero), so that the number of connections can be actually reduced.

As is described below, the data processing performed at the AR coefficient filter unit 303 in accordance with the present embodiment can also apply for averaging the covariance matrixes and the right hand side vectors.

In the present embodiment, although the AR spectral estimation process has been described using the covariance method, a modified covariance method may be applied to the AR spectral estimation process instead.

For using the modified covariance method, the elements of the covariance vector can be obtained by using equation (8) instead of equation (3).

$$C_x(j,k) = \frac{1}{2(N-M)} \left\{ \sum_{n=M}^{N-1} x(n-j)x(n-k) + \sum_{n=0}^{N-1-M} x(n+j)x(n+k) \right\} \quad (8)$$

$$k, j = 0, 1, \ldots, M$$

Second Embodiment

With reference to figures, it will be described an estimation method having a different process procedure.

Figure 13:
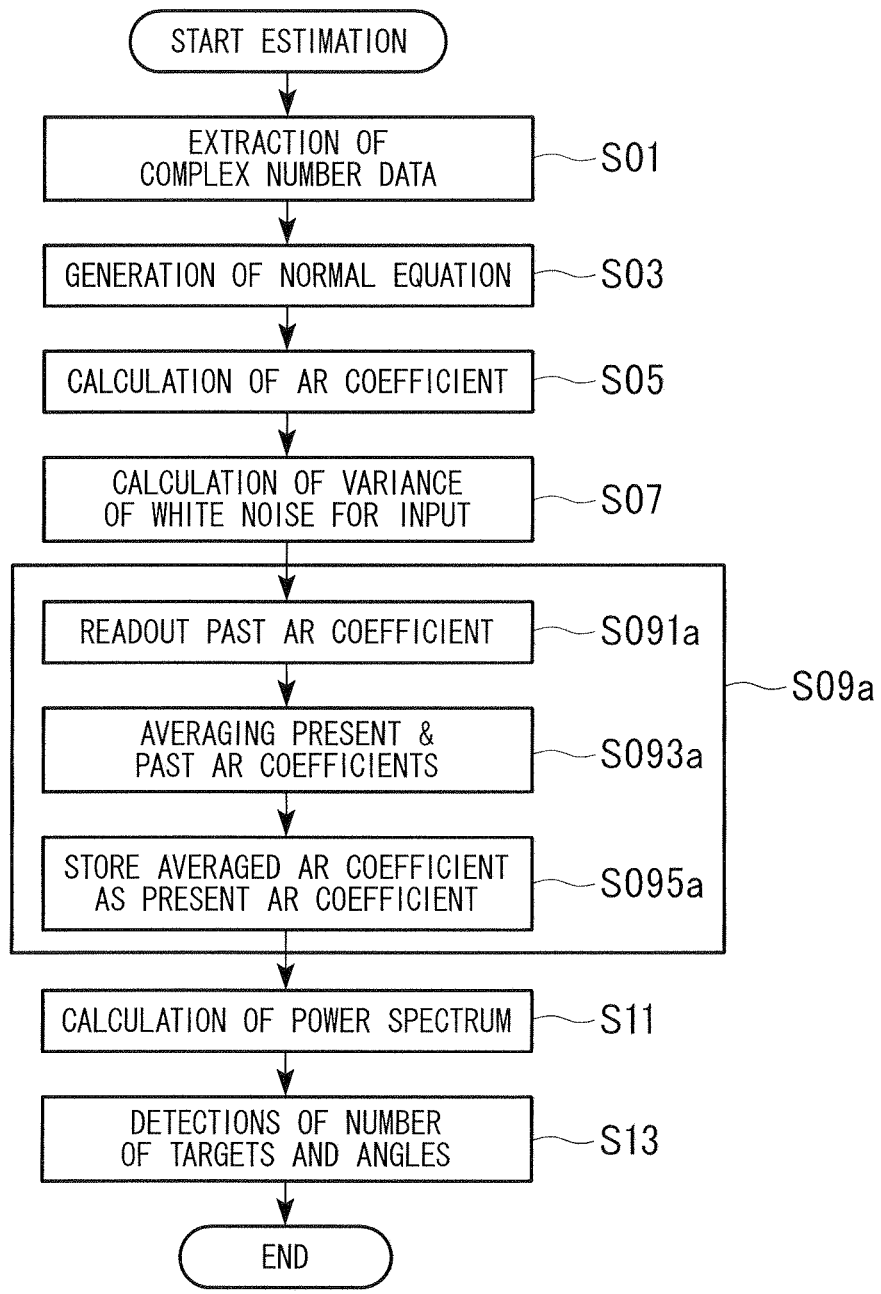
FIG. 13 is a flowchart illustrating data processing of a target direction estimation process in the electronic scanning radar apparatus in accordance with a second preferred embodiment of the present invention.

FIG. 13 is a flowchart illustrating data processing of a target direction estimation process in the electronic scanning radar apparatus in accordance with a second preferred embodiment of the present invention.

A process procedure shown in this figure can be applied to the electronic scanning radar apparatus shown in FIG. 1. The process procedure is explained with reference to the symbols used in FIG. 1. The flowchart of FIG. 13 shows a different procedure from that of FIG. 7 in step S09. For the identical procedures used in FIG. 7 and FIG. 13, the same symbols are assigned.

In step S09a of FIG. 13, the AR coefficient filter unit 303 receives the past AR coefficients from the target link unit 32, and receives the present AR coefficient calculated in the present detecting cycle from the AR coefficient calculation unit 302. At the AR coefficient filter unit 303, the past AR coefficients and the present AR coefficient are multiplied with those corresponding weighted factors. After the multiplications, the AR coefficient filter unit 303 performs an averaging process (step S09a).

The detection estimating unit 30 executes the data processing in step S09a according to the following procedure. The detection estimating unit 30 reads out AR coefficients (past AR coefficients) from the memory 21. For example, the AR coefficient filter unit 303 makes the target link unit 32 read the past AR coefficients stored in the storage area of the memory 21, and receives the past AR coefficients from the memory 21 (step S091a).

The detection estimating unit 30 executes the averaging process over the present AR coefficient and the past AR coefficients. For example, the present AR coefficient and the past AR coefficients are multiplied by each predetermined weighted coefficients. Then, the present AR coefficient and the past AR coefficients multiplied with the respective weighted coefficients are added up. This addition procedure is equivalent to a weighted average process, so that an AR coefficient is obtained by the averaging process, and an averaged AR coefficient can be obtained (step S093a).

The detection estimating unit 30 stores the averaged AR coefficient obtained in step S093a in the present detecting cycle into the memory as the present AR coefficient. For example, the AR coefficient filter unit 303 determines the averaged AR coefficient as "the present AR coefficient" to be stored in the memory 21. The AR coefficient filter unit 303 makes the target link unit 32 store the present AR coefficient in the memory 21 (step S093a).

By modifying the procedures described above, the AR coefficient to be stored into the storage area of the memory 21 becomes the averaged AV coefficient obtained by the averaging process.

Third Embodiment

With reference to figures, a description will be given of an estimation method having a different process procedure.

Figure 14:
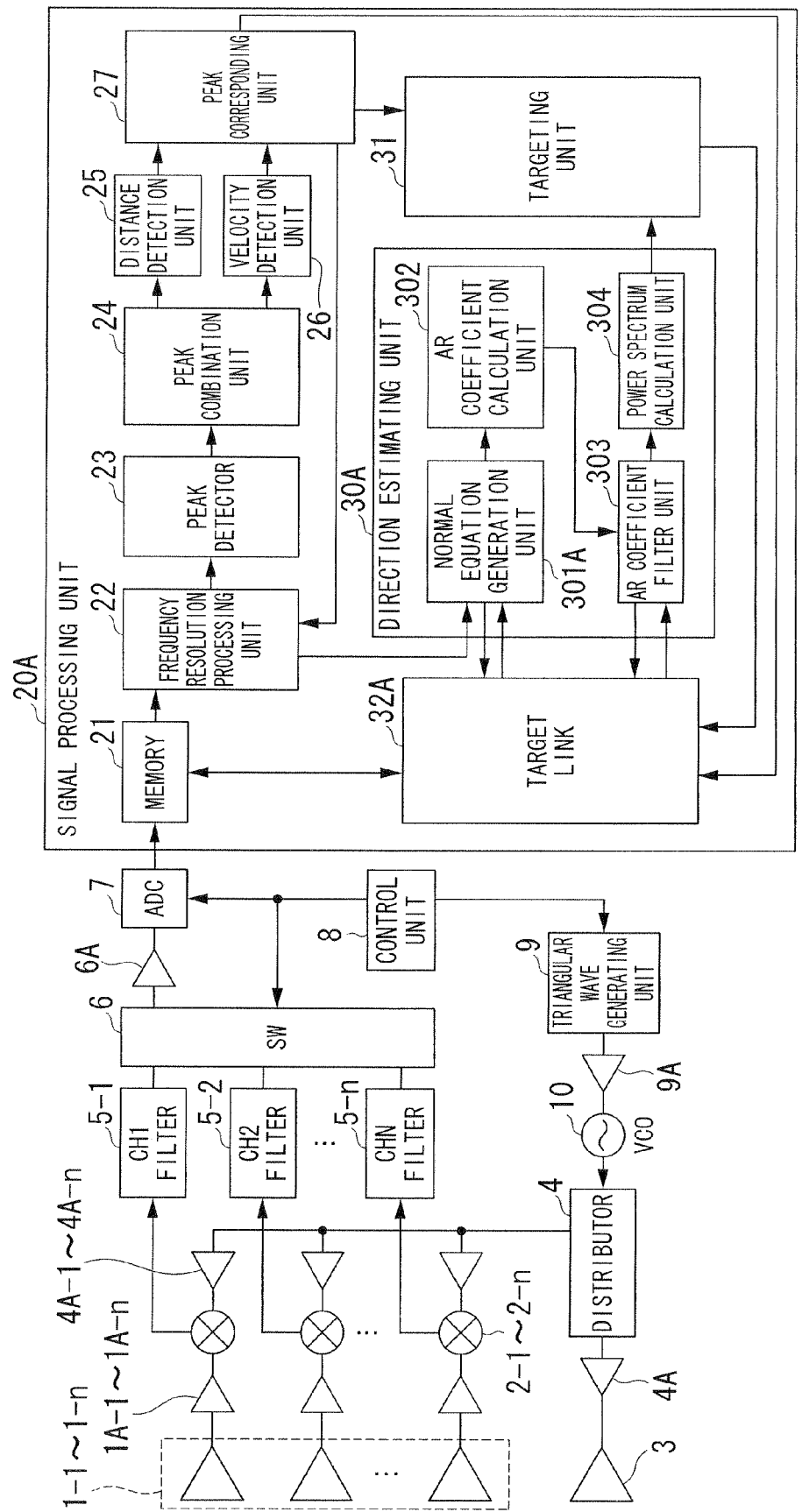
FIG. 14 is a block diagram of an electronic scanning radar apparatus in accordance with a third preferred embodiment of the present invention.

FIG. 14 is a block diagram of an electronic scanning radar apparatus in accordance with a third preferred embodiment of the present invention.

In the figure, the electronic scanning radar apparatus shows a different part from that of FIG. 1, which is a signal processing unit 20A. For the identical parts used in FIG. 1 and FIG. 14, the same symbols are used.

The signal processing unit 20A includes a memory 21, a frequency resolution processing unit 22, a peak detector 23, a peak combination unit 24, a distance detection unit 25, a velocity detection unit 26, a peak corresponding unit 27, a direction estimating unit 30A, a targeting unit 31, and a target link unit 32A.

Further, the direction estimating unit 30A includes a normal equation generation unit 301A, an AR coefficient calculation unit 302, an AR coefficient filter unit 303, and a power spectrum calculation unit 304.

The signal processing unit 20A performs an averaging process of the normal equations in addition to an averaging process of the AR coefficients.

In the detection estimating unit 30A, a normal equation generation unit 301A generates normal equations which are necessary for the AR spectral estimation. The normal equation generation unit 301A forms a correlation matrix obtained from the complex number data according to the beat frequencies obtained by performing the frequency resolution with the frequency resolution processing unit 22. The normal equation generation unit 301A generates a normal equation having elements of a covariance matrix and a right hand side vector based on the obtained correlation matrix.

Further, the normal equation generation unit 301A provides the covariance matrix and the right hand side vector to the target link unit 32A. In this case, the covariance matrix and the right hand side vector are complex number elements of the normal equation. The normal equation generation unit 301A stores the covariance matrix and the right hand side vector into the memory 21 through the target link unit 32A.

The normal equation generation unit 301A makes the target link unit 32A refer to the covariance matrixes and the right hand side vectors of the past normal equation stored in the memory 21, and receives the covariance matrix and the right hand side vector.

The normal equation generation unit 301A refers to the covariance matrix and the right hand side vector of the past normal equation. The normal equation generation unit 301A performs the averaging processing with corresponding weighted coefficients for the covariance matrix, the right hand side vector of the present normal equation and those of the past normal equation.

Namely, the normal equation generation unit 301A receives the past covariance matrix and the past right hand side vector from the target link unit 32A, and multiplies them using their corresponding weighted coefficients.

The normal equation generation unit 301A multiplies the present covariance matrix and the present right hand side vector by their corresponding weighted coefficients (factors). Further, the normal equation generation unit 301A executes the average processing.

The normal equation generation unit 301A generates a normal equation based on the averaged covariance matrixes and the averaged right hand side vectors.

The AR coefficient calculation unit 302 solves the normal equation and obtains AR coefficients.

FIG. 15 is a conceptual diagram that illustrates a data structure of a data table which information is stored and retained in accordance with the third preferred embodiment of the present invention.

A table shown in FIG. 15 includes additional lines compared to that of FIG. 10. The additional items indicate elements (mat_up, mat_dwn) of a normal equation and elements (vr_up, vr_dwn) of a right hand side vector. The number of rows is the same as the table of FIG. 10.

The covariance matrixs (mat_up, mat_dwn) and the right hand side vectors (vr_up, vr_dwn), which are the elements of the normal equation, can be recorded with other information of each target by association thereof with distance points. The elements, mat_up and mat_dwn indicate the covariance matrixes for an ascent and for a descent, respectively. Also, the elements, vr_up and vr_dwn indicate the right hand side vectors for the ascent and for a descent, respectively. The amount of the information on the covariance matrixs (mat_up, mat_dwn) and the right hand side vectors (vr_up, vr_dwn) are not related to the areas in the table. The storage area in the memory space is provided with the memory 21 for the covariance matrixs (mat_up, mat_dwn) and the right hand side vectors (vr_up, vr_dwn) as needed.

Figure 16:
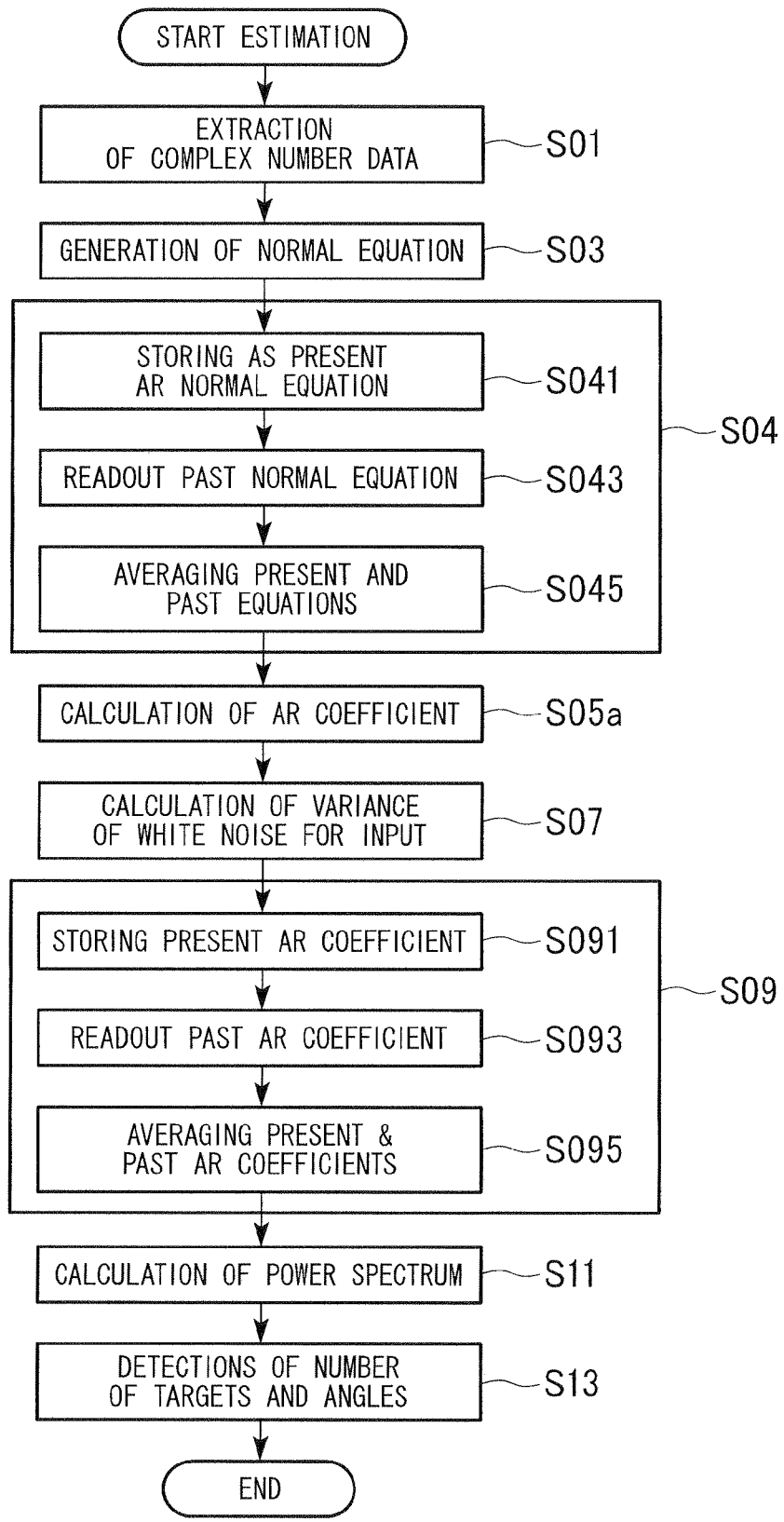
FIG. 16 is a flowchart illustrating data processing of a target direction estimation process in the electronic scanning radar apparatus in accordance with the third preferred embodiment of the present invention.

FIG. 16 is a flowchart illustrating data processing of a target direction estimation process in the electronic scanning radar apparatus in accordance with the third preferred embodiment of the present invention.

The flowchart indicates a sequential procedure of a data processing which additionally includes a data process of a step S04 compared to that of FIG. 13. The process step S05b is partially modified from that of FIG. 13. These features are the different points between the flow charts of FIG. 13 and FIG. 16. For the processes identical to those of FIG. 13, the same symbols are assigned in FIG. 16.

In step S04 indicated in the figure, the direction estimating unit 30A performs the averaging processes for a covariance matrix $C_M$ and a right hand side vector vc, which become elements of a normal equation of the present. The normal equation of the present may be referred to the present normal equation. The averaging processes are performed based on the present normal equation obtained by the present detecting cycle in step S03 and the normal equation obtained by the past (previous) detecting cycle. The normal equation obtained by the past (previous) detecting cycle may be referred to as the past normal equation.

The normal equation generation unit 301A stores the covariance matrix $C_M$ and the right hand side vector vc into the storage area of the memory 21 by the target link unit 32A (step S041). The covariance matrix $C_M$ and the right hand side vector vc become the elements of the present normal equation.

The normal equation generation unit 301A makes the target link unit 32A refer to a covariance matrix and a right hand side vector of the past normal equation stored in the memory 21, and receives the covariance matrix and the right hand side vector of the past normal equation through the target link unit 32A (step S043).

The normal equation generation unit 301A performs the weighted averaging process for each of the present covariance matrix and the past covariance matrixes, and performs the weighted averaging process for each of the present right hand side vector and past right hand side vectors based on the received covariance matrix and the received right hand side vector of the past normal equation. In other words, the normal equation generation unit 301A multiplies the past covariance matrixes and the past right hand side vectors by their corresponding weighted coefficients, and multiplies the present covariance matrix and the present right hand side vector by their corresponding weighted coefficients. Then, the normal equation generation unit 301A performs the averaging process for those covariance matrixes and the right hand side vectors. Thereby, the normal equation generation unit 301A generates averaged covariance matrixes and averaged right hand side vectors. The averaged covariance matrixes may be referred to as the weighted average covariance matrixes. The averaged right hand side vectors may be referred to as the weighted average right hand side vectors. The normal equation generation unit 301A generates an averaged normal equation based on the averaged covariance matrixes and the averaged right hand side vectors (step S045).

The coefficient calculation unit 302 obtains AR coefficients at the present by solving the averaged normal equation (step S05a). The AR coefficients at the present may be referred to as the present AR coefficients.

Figure 17:
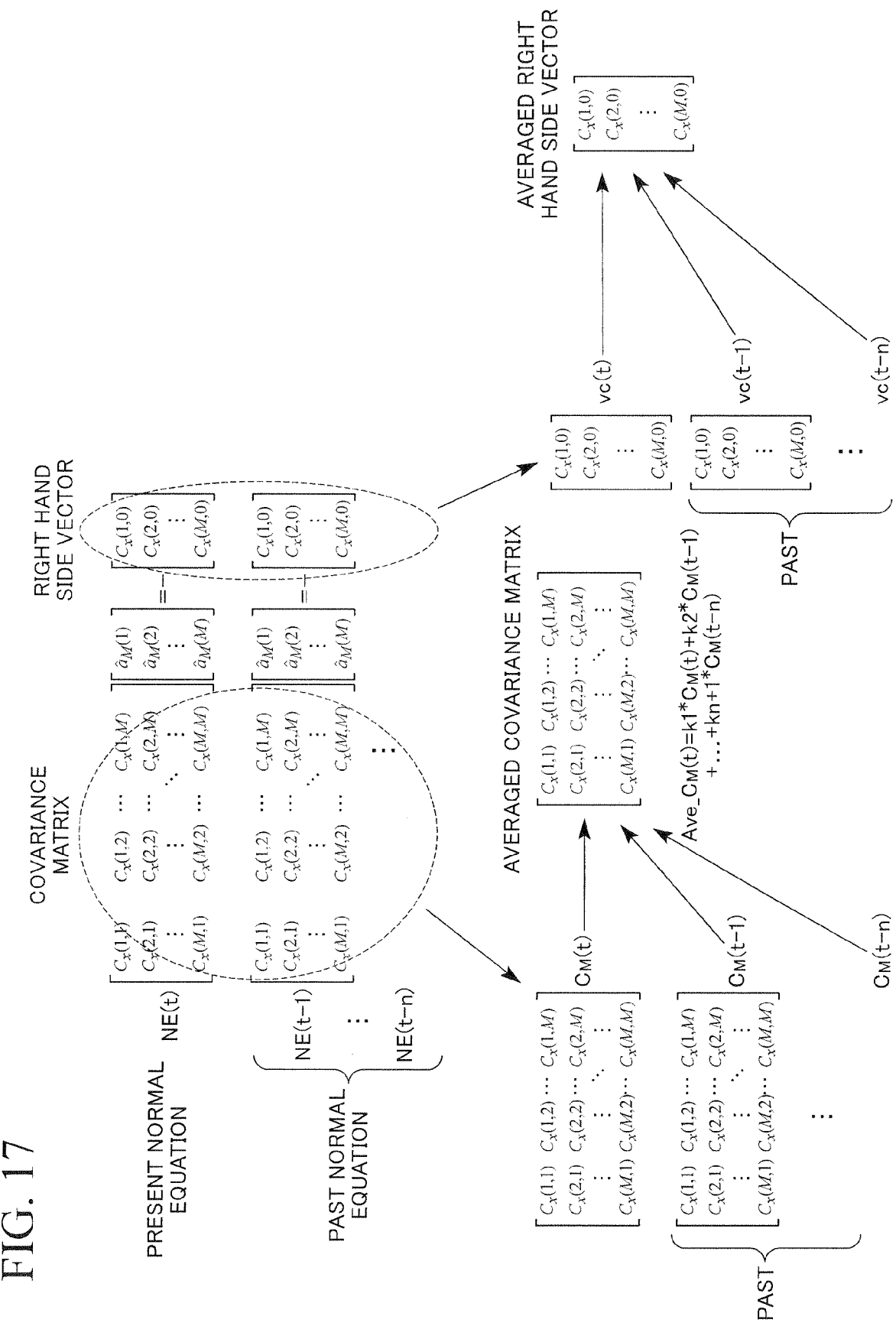
FIG. 17 is a drawing that illustrates an averaging process of normal equations for every detecting cycle in accordance with the third preferred embodiment of the present invention.

FIG. 17 is a drawing that illustrates an averaging process of normal equations obtained by every detecting cycle in accordance with the third preferred embodiment of the present invention.

In the figure, "the present normal equation" is obtained based on input data which are detected at the latest detecting cycle, which is an estimation process being repeatedly performed. The latest detecting cycle may be referred to as the present detecting cycle. The normal equation obtained at time t is expressed by NE(t). Further, in the retroactive order, at time (t−1), . . . , (t−n), the corresponding normal equations are written as NE(t−1), . . . , NE(t−n).

When the covariance vectors are written as $C_M(t)$, $C_M(t-1)$, . . . , $C_M(t-n)$ at time t, (t−1), . . . , (t−n), the averaging process is performed according to adding operations as shown in equation (9).

The averaging process of elements of complex numbers can be performed for the real part and the imaginary part, respectively.

$$Ave\_C_M(t)=k1*C_M(t)+k2*C_M(t-1)+ \ldots +kn+1*C_M(t-n) \quad (9)$$

In equation (9), $A_{ve}\_C_M(t)$ indicates an averaged covariance matrix which is obtained by adding the present covariance matrix $C_M(t)$ and past covariance matrixes $C_M(t-1), \ldots, C_M(t-n)$ detected for past n times of detecting cycles with weighted coefficients, where k1*, k2*, . . . , kn+1* are weighted coefficients being used.

With the method described above, it becomes possible to perform the averaging process of the covariance matrix.

Also, when the right hand side vectors are written as vc(t), vc(t−1), . . . , vc(t−n) at time t, (t−1), . . . , (t−n), the averaging process is performed according to adding operations as shown in equation (10).

The averaging process of elements of complex numbers can be performed for the real part and the imaginary part, respectively.

$$Ave\_vc(t)=k1*vc(t)+k2*vc(t-1)+ \ldots +kn+1*vc(t-n) \quad (10)$$

In equation (9), $A_{ve}\_vc(t)$ indicates an averaged right hand side vector which is obtained by adding the present right hand side vector vc(t) and the past right hand side vectores vc (t−1), . . . , vc (t−n) detected for past n times of detecting cycles with weighted coefficients, where k1*, k2*, . . . , kn+1* are weighted coefficients being used.

With the method described above, it becomes possible to perform the averaging process of the right hand matrix.

Therefore, by using the averaged covariance matrix $A_{ve}\_C_M(t)$ and the averaged right hand side vector $A_{ve}\_vc(t)$ obtained by equations (9) and (10), the averaged normal equation can be obtained. Further, it becomes possible that AD coefficients are obtained from the averaged normal equation.

In this way, the AR coefficients are obtained by solving the averaged normal equation, further averaging process can be made by using the averaging process of AR coefficients in step S09s. By performing the combining of steps of S04 and S09, errors included in the calculation results can be averaged in step S09. Errors included in the detected information can be reduced.

Thereby, in accordance with the present preferred embodiment, it becomes possible to obtain stable characteristics of spectrum peaks. The angles of the incoming waves can be detected accurately.

Fourth Embodiment

With reference to figures, a description will be given of an estimation method having a different process procedure.

Figure 18:
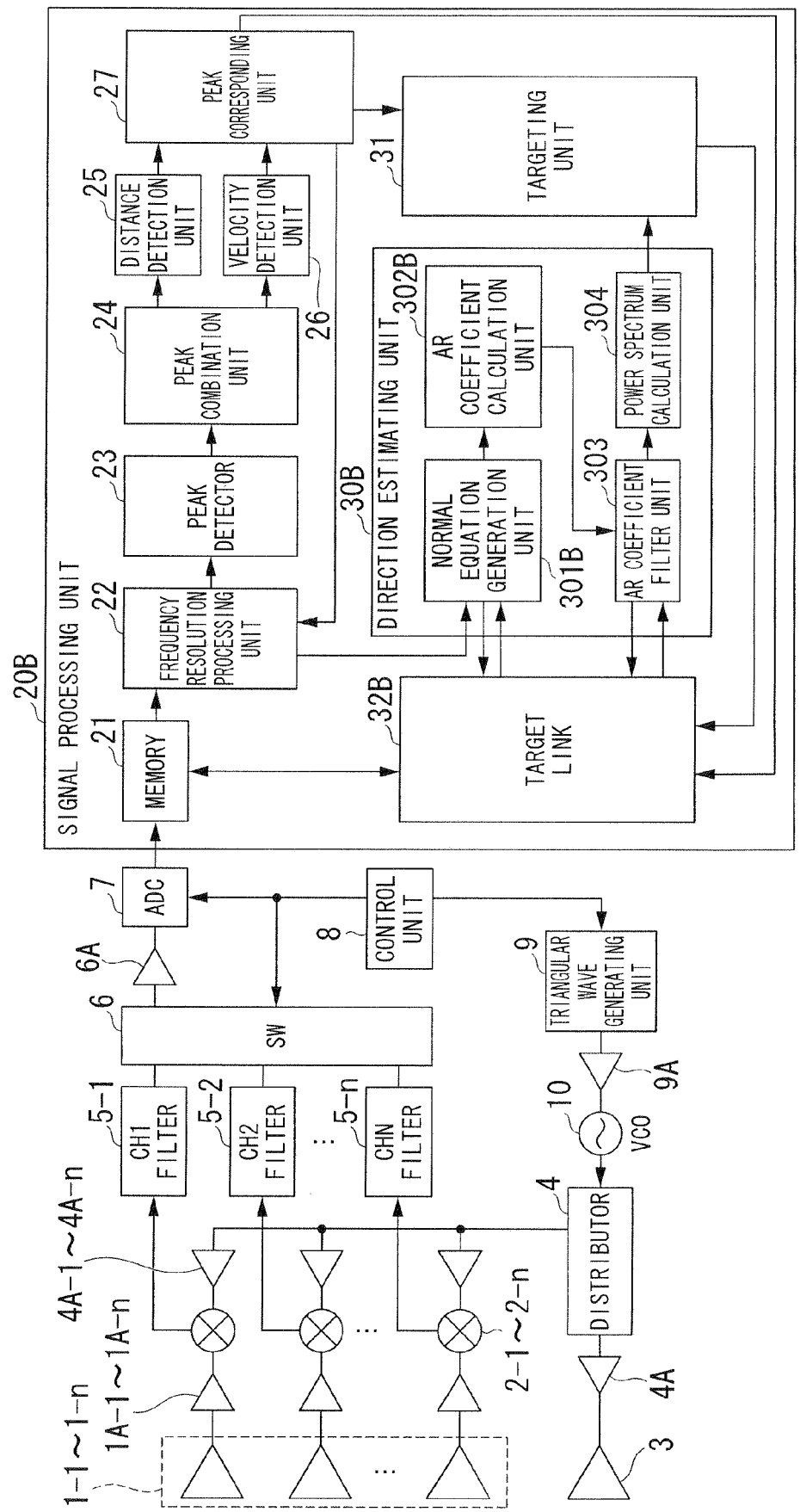
FIG. 18 is a block diagram of an electronic scanning radar apparatus in accordance with a fourth preferred embodiment of the present invention.

FIG. 18 is a flowchart illustrating data processing of a target direction estimation process in the electronic scanning radar apparatus in accordance with a fourth preferred embodiment of the present invention.

In the figure, the electronic scanning radar apparatus in accordance with the present preferred embodiment includes a different part from that of FIG. 1, which is a signal processing unit 20B. For the identical parts used in FIG. 1 and FIG. 18, the same symbols are assigned in the figure.

The signal processing unit 20B includes a memory 21, a frequency resolution processing unit 22, a peak detector 23, a peak combination unit 24, a distance detection unit 25, a velocity detection unit 26, a peak corresponding unit 27, a direction estimating unit 30B, a targeting unit 31, and a target link unit 32B.

Further, the direction estimating unit 30B includes a normal equation generation unit 301B, an AR coefficient calculation unit 302B, an AR coefficient filter unit 303, and a power spectrum calculation unit 304.

The signal processing unit 20B reads out the complex number data stored in the memory 21 and performs the averaging process of the normal equation prior to the averaging process of AR coefficients. In the direction estimating unit 30B, the normal equation generation unit 301B provides the target link unit 32B with the complex number data (the present complex number data) from the frequency resolution processing unit 22. The present complex number data may be referred to as the present data, likewise, past complex number data may be referred to as past data.

The normal equation generation unit 301B makes the target link unit 32B refer to past data of a target stored in the memory 21, and receives the past data for information to obtain a past normal equation through the target link unit 32B.

The normal equation generation unit 301B generates normal equations which are required to perform estimation processes of the present and past AR spectra.

That is, the normal equation generation unit 301B forms correlation matrixes obtained from the complex number data of beat frequencies which are obtained based on the frequency resolution performed with the frequency resolution processing unit 22. Then the normal equation generation unit 301B generates the normal equations based on the correlation matrixes. Further, the normal equation generation unit 301B makes the target link unit 32B refer to the past covariance matrixes and the past right hand side vectors stored in the memory 21. The past covariance matrixes and the past right hand side vectors form the past normal equation. The normal equation generation unit 301B receives the past covariance matrixes and the past right hand side vectors from the memory 21 through the target link unit 32B.

The normal equation generation unit 301B refers the covariance matrixes and the right hand side vectors of the received past normal equations, and performs the weighted averaging process for the present covariance matrixes and the past covariance matrixes, and for the present right hand side vectors and the past right hand side vectors, respectively.

Namely, the normal equation generation unit 301B receives the past covariance matrix and the past right hand side vector from the target link unit 32B, and multiplies the present covariance matrix and the present right hand side vector by their corresponding weighted coefficients. Further, the normal equation generation unit 301B executes the average processing for the weighted present covariance matrix and the weighted past covariance matrix and for the weighted present right hand side vector and the weighted past right hand side vector. The normal equation generation unit 301B generates a normal equation based on the averaged covariance matrix and the averaged right hand side vector.

The AR coefficient calculation unit 302B solves the normal equation and obtains the present AR coefficient.

FIG. 19 is a conceptual diagram that illustrates a data table which information is stored and retained in accordance with the fourth preferred embodiment of the present invention.

A table shown in FIG. 19 includes additional lines compared to that of FIG. 10. The additional lines indicate elements of the complex number data (x_up, x_dwn) of a normal equation. The number of rows is the same as in the table of FIG. 10.

The complex number data, which are data of elements of a normal equation, can be recorded in the memory 21 being associated with other information of each target. The items x_up and x_dwn indicate the complex number data for the ascent and the descent, respectively. The amount of the information on the complex number data (x_up, x_dwn) is not expressed by the areas in the table. The storage area in the memory space is provided with the memory 21 for the complex number data (x_up, x_dwn) as needed.

Further, the storage area of the memory required in the present embodiment can be reduced compared to the case of the third embodiment.

Figure 20:
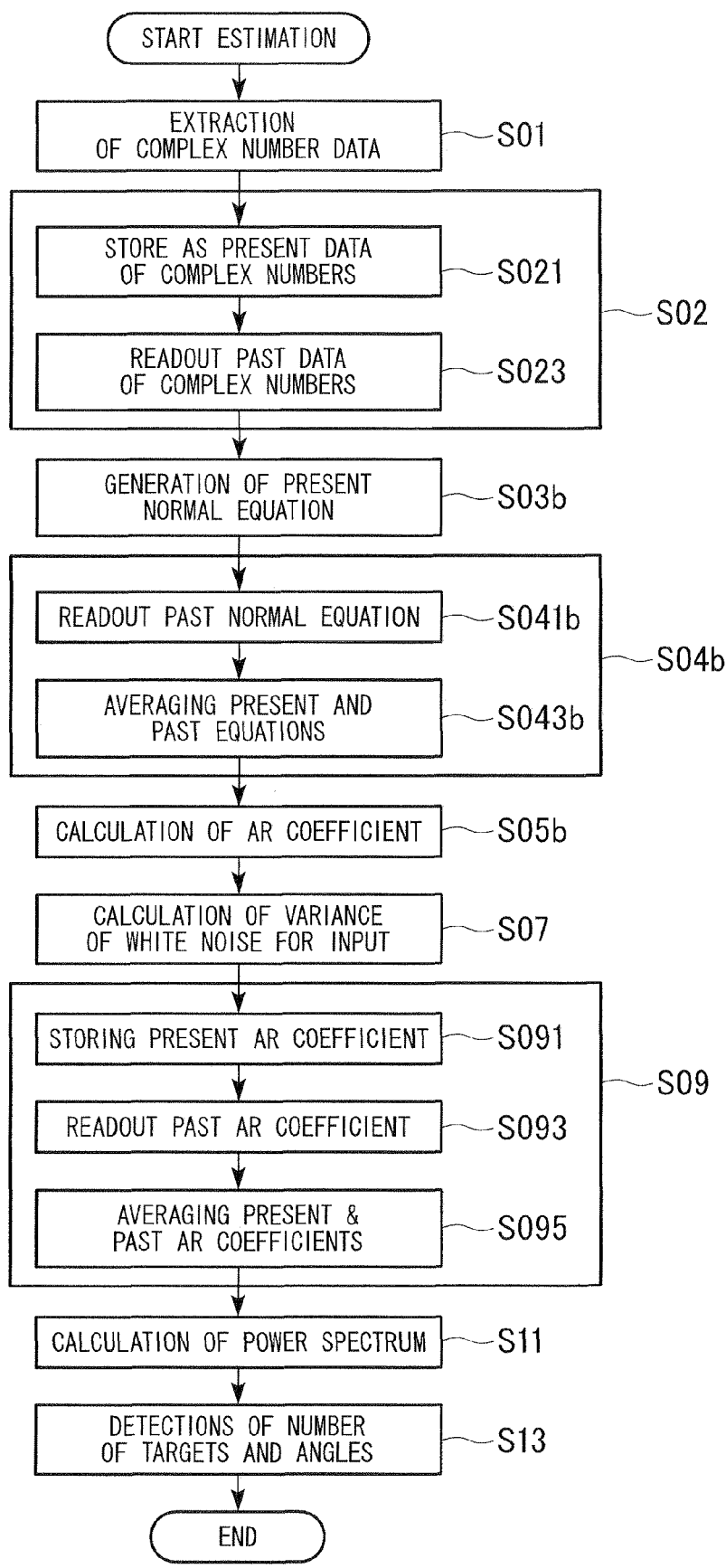
FIG. 20 is a flowchart illustrating data processing of a target direction estimation process in the electronic scanning radar apparatus in accordance with the fourth preferred embodiment of the present invention.

FIG. 20 is a flowchart illustrating data processing of a target direction estimation process in the electronic scanning radar apparatus in accordance with the fourth preferred embodiment of the present invention.

The flowchart shows process steps which are different from those of FIG. 13 by adding steps S02 and S04b. Further, the process steps of S03b and S05b are partly modified from those of FIG. 13. These features are the different points between the flowcharts of FIG. 13 and FIG. 20. For the identical steps used in FIG. 13 and FIG. 20, the same symbols are assigned.

In step S02 in the flowchart of FIG. 20, the normal equation generation unit 301B makes the target link unit 32B store the complex number data acquired by the frequency resolution processing unit 22 in the present detecting cycle into the storage area of the memory 21 (step S021). The complex number data obtained at the present may be referred to as the present complex data, likewise, past complex number data may be referred to as the past complex data.

The normal equation generation unit 301B makes the target link unit 32B refer to the past complex data stored in the memory 21 and receives the past complex data for obtaining past normal equations (step S023).

Subsequently, the normal equation generation unit 301B in the direction estimating unit 30B obtains a normal equation based on the present complex data acquired at the present detecting cycle (step S03b).

Further, in step S04b, the normal equation generation unit 301B performs the averaging process for the covariance matrix $C_M$ and the right hand side vector vc based on the present normal equation and the past normal equations, in which the present normal equation is obtained at the present detecting cycle, and the past normal equations are obtained from the past complex data detected in the past detecting cycles.

Namely, the normal equation generation unit 301B generates a normal equation based on the past complex data received from the target link unit 32B (step S041b). The time when the normal equation is formed corresponds to the time when the past complex data are detected.

The normal equation generation unit 301B performs the averaging process for the past covariance matrix and the present covariance matrix, and for the past right hand side vector and the present right hand side vector, respectively. The present normal equation is formed by the present covariance matrix and the present right hand side vector. Each of the past normal equations is formed by the past covariance matrix and the past right hand side vector.

Namely, the normal equation generation unit 301B generates the past normal equation which corresponds to the past covariance matrix and the past right hand vector. Then, the normal equation generation unit 301B multiplies the matrix and the vector by respective weighted values. The normal equation generation unit 301B also multiplies the present covariance matrix and the present right hand side vector by respective weighted values.

The normal equation generation unit 301B generates an averaged normal equation which is averaged based on the averaged covariance matrix and the averaged right hand side vector (step S043b).

The AR coefficient calculation unit 302B solves the averaged normal equation and obtains the preset AR coefficient (step S05b).

According to the procedures described above, influence caused by errors or the like included in the detected information can be reduced by performing the averaging process for the covariance matrix and the right hand side vector which form input information on the normal equation.

Further, the AR coefficients, being obtained by solving the normal equation, are averaged through the AR coefficient averaging process in step S09.

In this way, by performing the combination of process steps S04b and S09, it becomes possible for the characteristics of spectrum peaks to be stably obtained, and the detecting accuracy of an angle for incoming waves is improved.

Fifth Embodiment

Further, the electronic scanning radar apparatus in accordance with a fifth preferred embodiment is explained with reference to figures.

Figure 21:
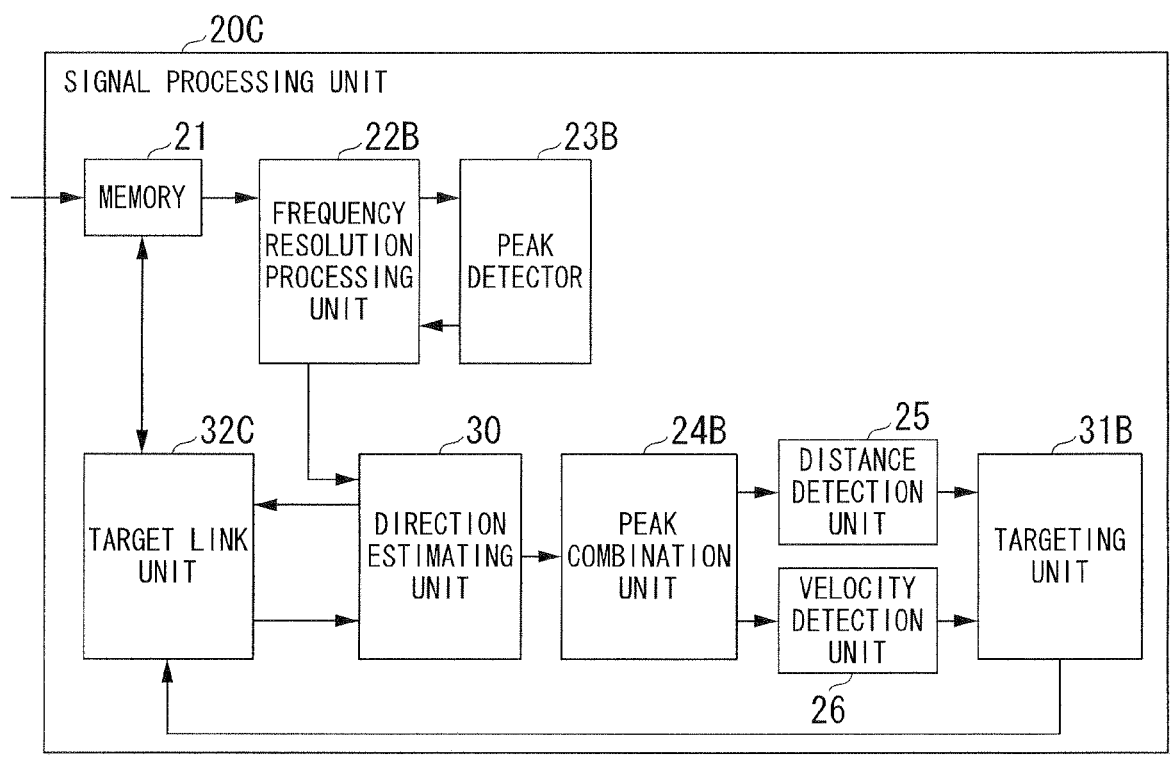
FIG. 21 is a block diagram that illustrates a signal processing unit of an electronic scanning radar apparatus in accordance with a fifth preferred embodiment of the present invention.

FIG. 21 is a block diagram that illustrates a signal processing unit 20C of an electronic scanning radar apparatus in accordance with a fifth preferred embodiment of the present invention.

Similar to the first embodiment, in the present embodiment, a description will be made for the performing of the direction estimation with a high resolution algorithm. In FIG. 21, for portions identical to those of FIG. 1, the same symbols are assigned. The different points from the first embodiment will be described below.

In the signal processing unit 20C, the frequency resolution processing unit 22B transforms beat signals of each antenna for an ascent and a descent into the complex number data. Then, the frequency resolution processing unit 22B transmits frequency points indicating the beat frequencies and the complex number data to a peak detector 23B.

Further, the peak detector 23B detects peak values for the ascent and the descent and frequency points which correspond to respective peak values, and the peak detector 23B transmits the frequency points to the frequency resolution processing unit 22B.

The frequency resolution processing unit 22B transmits the complex number data for the ascent and the descent to the direction estimating unit 30.

The complex number data are set to the target groups for the ascent and the descent, in which the target group includes beat frequencies having peak values for the ascent and the descent.

In a target link unit 32C of the signal processing unit 20C, as it is required to associate between a past target having been determined in the past detecting cycle and two target groups for the ascent and the descent, the memory 21 stores the data table shown in FIG. 22.

The target link unit 32C performs a target connection process between the present detecting cycle and the past detecting cycles. The target connection process is similar process to that performed by the target link unit 32 of FIG. 1.

The direction estimating unit 30 performs the averaging process for the AR coefficients for the ascent and the descent detected in the present detecting cycle and the past detecting cycles, respectively.

Further, the direction estimating unit 30 detects an angle θ for each of the ascent and the descent, and transmits the angle θ to the peak combination unit 24B as data in tables of FIGS. 23A and 23B.

FIG. 23A illustrates a data table that indicates angles and frequency points for every target for the ascent in the present detecting cycle, and FIG. 23B illustrates a data table that indicates angles and frequency points for every target for the descent in the present detecting cycle.

Thus, the peak combination unit 24B combines data having similar angles based on the information on the tables of FIGS. 23A and 23B. Further, the peak combination unit 24B combines the beat frequencies for the ascent and the descent. The peak combination unit 24B transmits the obtained combination to the distance detection unit 25 and the velocity detection unit 26.

Similar to the case of the first embodiment, the distance detection unit 25 calculates distances based on the combination for the beat frequencies for the ascent and for the descent.

Similar to the case of the first embodiment, the velocity detection unit 26 calculates a relative velocity based on the combination for the beat frequencies at the ascent and at the descent.

Each of the distance detection unit 25 and the velocity detection unit 26 does not include a filtering process which is based on the averaging process of the present detecting cycle and the past detecting cycle, unlike the case of detecting directions.

Each of the distance detection unit 25 and the velocity detection unit 26 calculates the distances and the relative velocity, respectively, based on the combination for the beat frequencies at the ascent and at the descent.

The targeting unit 31B determines the AR coefficients, the frequency points, the distances and the relative velocities for the ascent and the descent as a present state.

Further, the target link unit 32C stores the frequency points and the AR coefficients for the ascent and the descent, the distance, the longitudinal position, the lateral position, the relative velocity into the table of FIG. 22 for each target using the similar data process of the first embodiment.

In the present embodiment, the table in FIG. 22 may store not only the AR coefficients, but also the complex number data indicating the peak value of the beat frequency or the covariance matrix and the right hand side vector.

Sixth Embodiment

An electronic scanning radar apparatus of the sixth embodiment will be explained below.

Figure 24:
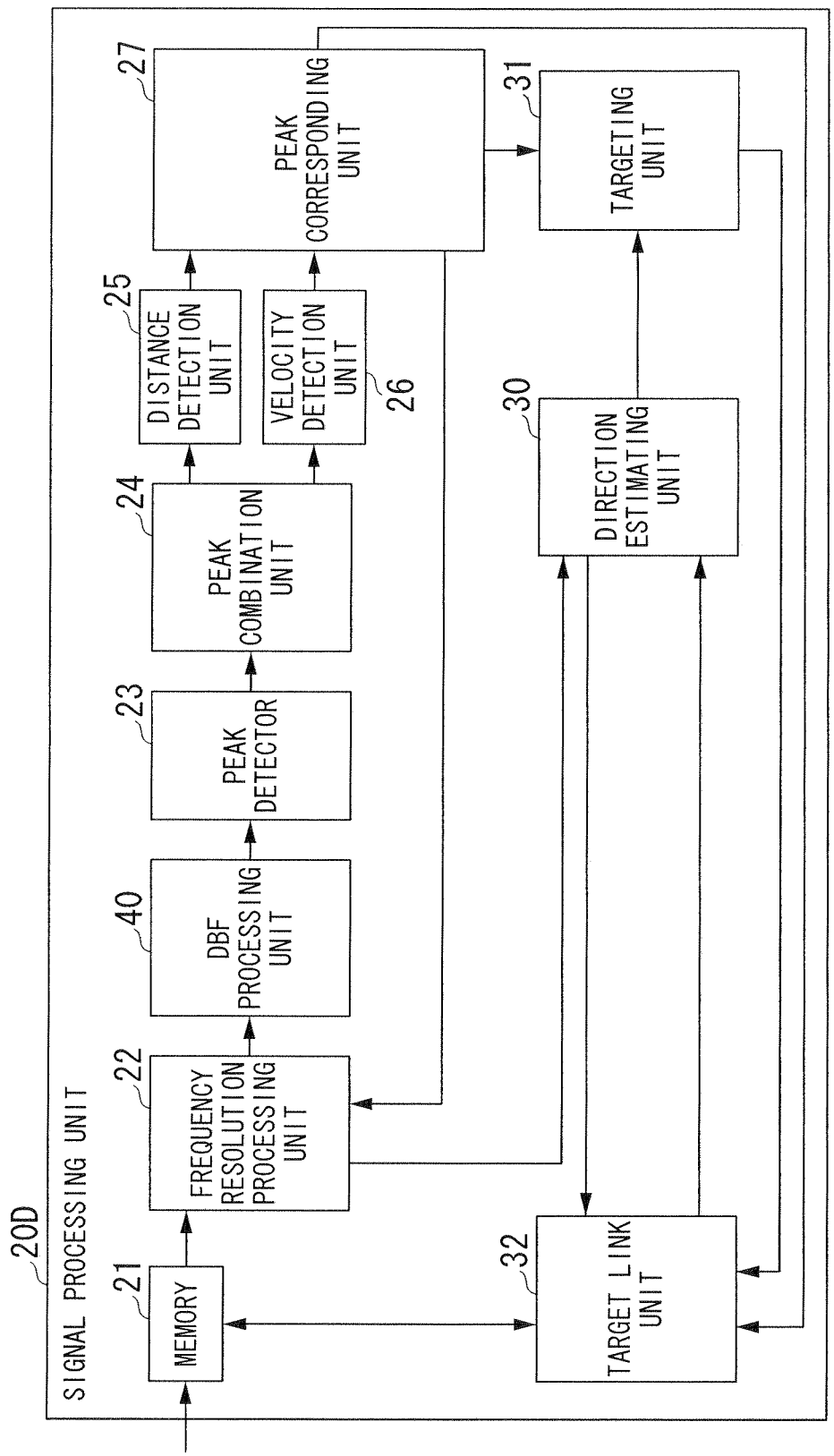
FIG. 24 is a block diagram illustrating a signal processing unit of an electronic scanning radar apparatus in accordance with a sixth preferred embodiment of the present invention.

FIG. 24 is a block diagram illustrating a signal processing unit 20D of an electronic scanning radar apparatus in accordance with the sixth embodiment of the present invention.

Unlike the first embodiment, in the present embodiment, the signal processing unit 20D preliminarily performs a direction estimation using a DBF (Digital Beam Forming) method having a resolution which is low compared to that of an algorithm with a high resolution such as the AR spectral estimation process or the like. Then, the direction estimation is performed with a high resolution algorithm based on the AR spectral estimation process which uses the averaged AR coefficients.

In the present embodiment, for portions which are similarly used in the case of the first embodiment shown in FIG. 1, identical symbols are assigned. In the following, a description will be made for the different points from the case of the first embodiment.

As shown in FIG. 24, a DBF processing unit 40 is provided between the frequency resolution processing unit 22 and the peak detector 23 of FIG. 1, and the direction of an incoming wave is preliminarily detected with the DBF processing unit 40, which is different from the case of the first embodiment as described above.

Similar to the case of the first embodiment, the frequency resolution processing unit 22 performs frequency resolution (temporal Fourier transformation) for the beat signal to be input, and transmits the frequency points indicating beat frequencies and the complex number data to the DBF processing unit 40.

Subsequently, the DBF processing unit 40 performs Fourier transformation of the complex number data of each antenna receiving signals along the direction where the antennas are arranged, that is, Spatial Fourier transformation is performed.

Further, the DBF processing unit 40 calculates spatial complex number data depending on angles, which are the complex number data of each angle according to an angle resolution. The DBF processing unit 40 transmits the obtained spatial data to the peak detector 23 for each beat frequency.

In this way, a spectrum is formed from spatial complex number data for each angle channel (for each beat frequency), thus the spectrum depends on the incoming direction of a receiving wave. The resolution of the receiving wave depends on the resolution of the beam scanning.

Further, as Fourier Transformation is performed for the arranged direction of the antennas, an obtained result can be expected to include the same effect as if data are obtained by adding the complex number data between the channel angles. Therefore, an S/N (signal-to-noise) ratio of the complex number data for each angle channel can be improved, and thus it becomes capable of improving the detection accuracy of a peak, similar to the case of the first embodiment.

Similar to the first embodiment, the complex number data and the spatial complex number data are obtained for an ascent and a descent.

The peak detector 23 performs the data processing using the peak detector 23, and then detects a peak for each of the angle channels based on the result of the data processing of the peak detector 23. Further, the peak detector 23 transmits each of the detected data to the peak combination unit 24 for each of the angle channels. Therefore, when the spatial Fourier Transformation is performed with sixteen resolutions, the number of angle channels becomes 15.

Similar to the case of the first embodiment, the peak combination unit 24 combines the beat frequencies having peak values for the ascent and the descent and their peak values. Then, the peak combination unit 24 transmits the combined results to the distance detection unit 25 and the velocity detection unit 26 for each of the angle channels.

Further, the peak corresponding unit 27 generates a table of FIG. 5 for each angle channel based on the distance r and the relative velocity v received in order from the distance detection unit 25 and the velocity detection unit 26. Subsequently, the peak corresponding unit 27 determines, for each channel, appropriate combinations between peaks of individual targets for the ascent and the descent, which is similar to the case of the first embodiment. In this case, as the resolution of the DBF indicates the existence of a target over plural angle channels, the corresponding unit 27 performs appropriate combinations between peaks of individual targets for the ascent and the descent by takes into account the neighboring angle channels (matrix).

Then, the corresponding unit 27 determines a pair of peaks for the ascent and the descent, and transmits a target group number to the targeting unit 31 with indicating a determined velocity r and a determined relative velocity v. Thus, the table of FIG. 25 is formed.

FIG. 25 illustrates a data table which includes data such as distances, vertical positions, lateral positions, and relative velocities which have been determined by the combination process of data peaks between the ascent and the descent.

The corresponding unit 27 can obtain not only the distances r and the relative velocities r but also information on angle channels of each of targets, so that the corresponding unit 27 creates the data table of FIG. 25, which indicates the result of each target group at the present detecting cycle including the longitudinal positions and the lateral positions in addition to the data table of FIG. 6.

Further, the target link unit 32 performs a combination process which associates between a target of the present detecting cycle and a target of the past detecting cycles of FIG. 10 using the information on the table of FIG. 25.

In this case, as combination parameters, a vertical position and lateral position are used in addition to a distance, a relative velocity and a peak frequency point, it becomes possible to improve the accuracy of the combination process.

Further, the target link unit 32 can improve the reliability of detecting directions by estimating the direction based on a logical AND operation between the direction information received from the detection estimating unit 30 and the direction information received from the DBF processing unit 40. Also, individual information on the directions can be shared for use. For example, when the targets are positioned within a close distance, the information on the DBF processing unit 40 may be used because the angle resolution may be rough when the target is close.

In the present embodiment, additional information such as the complex number data of the beat frequency having a peak value or the right hand side vector of a covariance matrix may be stored in addition to the content of the table of FIG. 10.

Seventh Embodiment

An electronic scanning radar apparatus in accordance with a seventh preferred embodiment will be described below.

Figure 26:
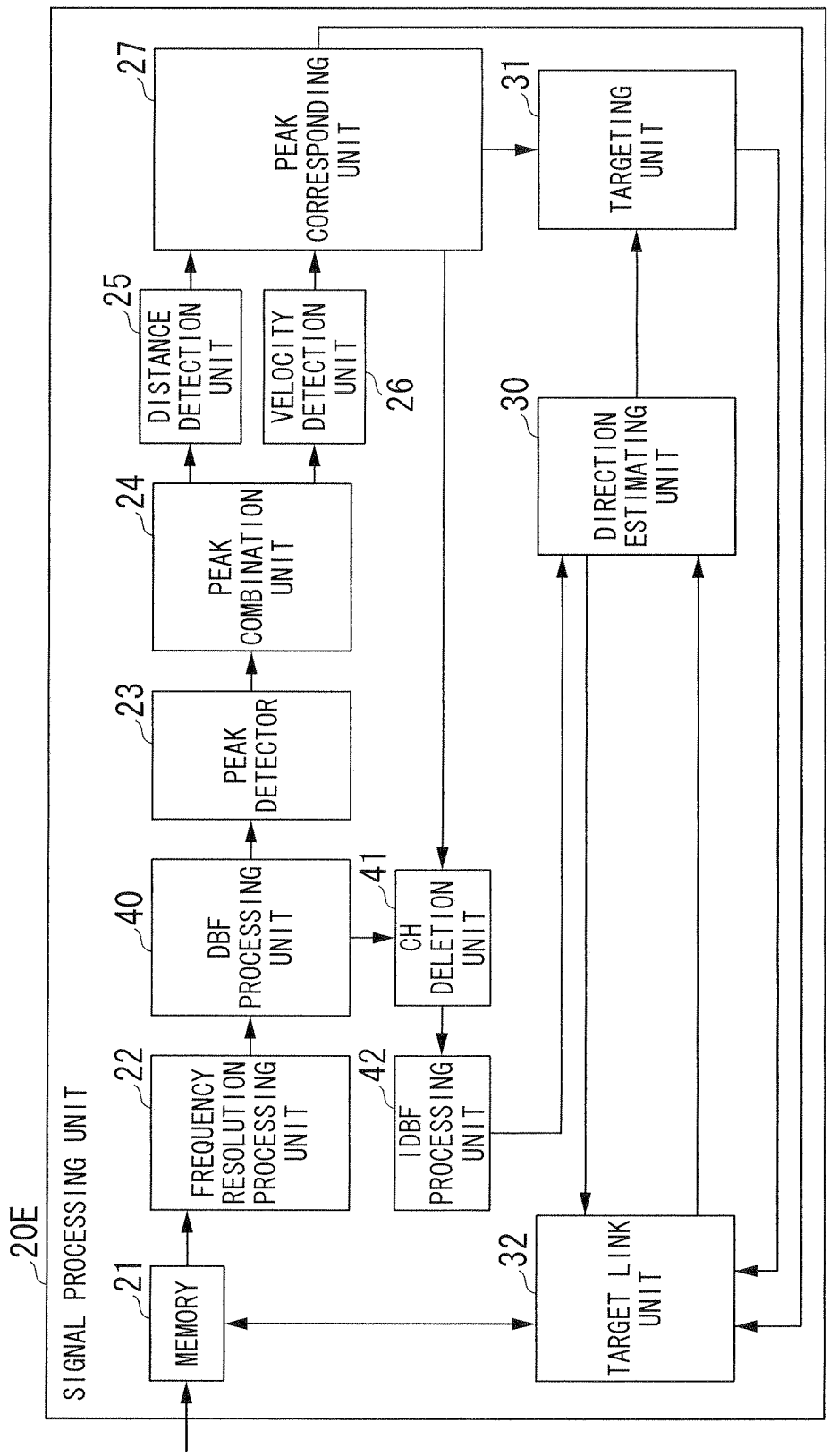
FIG. 26 is a block diagram illustrating a signal processing unit of an electronic scanning radar apparatus in accordance with a seven preferred embodiment of the present invention.

FIG. 26 is a block diagram illustrating a signal processing unit 20E of an electronic scanning radar apparatus in accordance with the seventh preferred embodiment of the present invention.

Unlike the first embodiment, in the present embodiment, the signal processing unit 20E preliminarily performs a direction estimation based on a DBF (Digital Beam Forming) method having a resolution which is low compared to that of an algorithm with a high resolution such as the AR spectral estimation process or the like. The signal processing unit 20E narrows a range of direction, and performs an inverse digital beam forming (IDBF, or Inverse Spatial Fourier Transformation), having the data obtained from the frequency resolution processing unit 22 into the complex number data on the time axis, in order to improve the accuracy of a succeeding direction estimation which has a high resolution algorithm.

In the present embodiment, identical symbols are assigned for portions which are similarly used in the case of the sixth embodiment shown in FIG. 24. In the following, an explanation will be given for the points different from the case of the sixth embodiment.

In the present embodiment, additional units, a channel deletion (Ch-deletion) unit 41 and an IDBF processing unit 42 are added to the signal processing unit 20D of the sixth embodiment.

Similar to the sixe embodiment, the DBF processing unit 40 of FIG. 26 performs the Partial Fourier Transformation of data, and transmits the spatial complex number data to the Ch-deletion unit 41 as well as the peak detector unit 23.

Figure 27A:
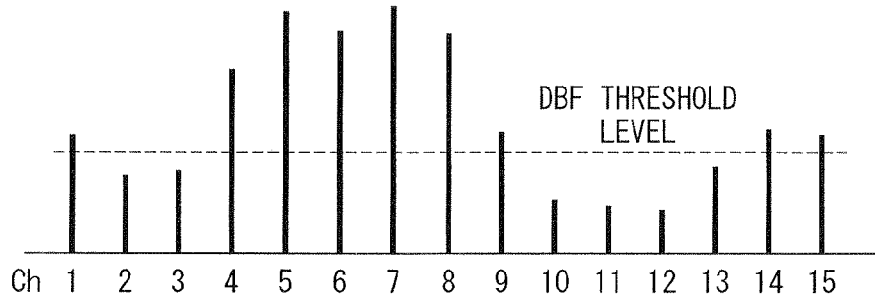
FIGS. 27A, 27B, and 27C are conceptual diagrams for describing data processing of intensities of spectra for respective angle-channels.

As shown in FIG. 27A, the DBF processing unit 40 performs the spatial Fourier Transformation with 16 point resolutions in the arranged direction of the receiving antennas, resulting a spectrum of 15 angle channels as a function of the angles. Then, the DBF processing unit 40 transmits the obtained spectrum to the Ch-deletion unit 41.

The Ch-deletion unit 41 detects signal levels if the signal levels (spectrum levels) exist adjacently and continuously within a predetermined angle range, and if the signal levels exceed a predetermined DBF threshold level. Each of the signal levels indicates the spatial complex number data. The spatial complex number data correspond to a peak frequency point (for example, at a descent) of a DBF target, which has been preliminary determined by the peak corresponding unit 27. Further, the Ch-deletion unit 41 replaces the rest of the signal levels being less than the predetermined DBF threshold by "0." The Ch-deletion unit 41 transmits the obtained spatial complex number data to the Ch-deletion unit 41, in which the obtained spatial complex number data correspond to signal levels "0" and the retained signal levels of the angle channels. The obtained spatial complex number data may be referred to as the narrowed data.

Figure 27B:
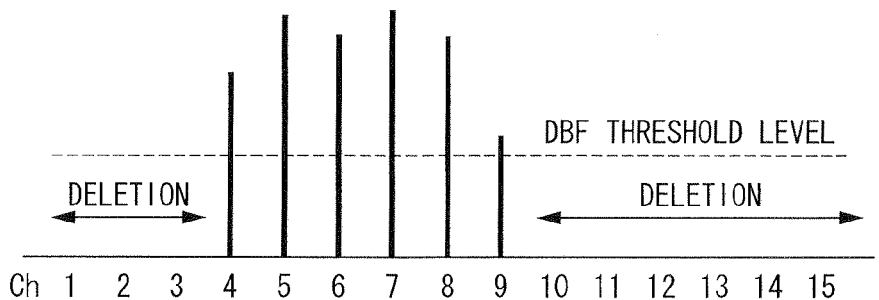

In the process described above, for example, if adjacent six angle channels have signal levels exceeding the predetermined DBF threshold level as shown in FIG. 27B, the Ch-deletion unit 41 determines that targets more than one exist in the range, and replaces the rest of the signal levels of the other angle channels by "0". This procedure may be referred to as a spectrum narrowing process. The spatial complex number data may be referred to as adjusted spatial complex number data.

Further, the IDBF processing unit 42 performs the partial inverse Fourier Transformation for the narrowed data and forms IDBF data. The DBF processing unit 42 transmits the IDBF data to the direction estimating unit 30.

Figure 27C:
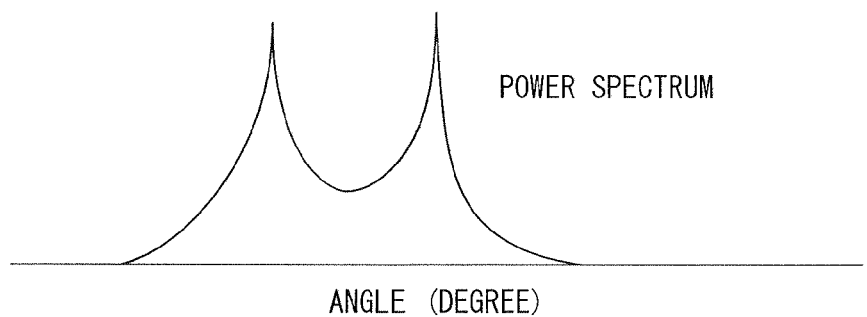

Further, as the direction estimating unit 30 calculates a correlation matrix using the IDBF data received from the IDBF processing unit 42. The direction estimating unit 30 can obtain the correlation matrix with a proper orthogonality, which eliminates obstacles on the road side and reduces noises. FIG. 27C is an example of a power spectrum that is obtained by forming a normal equation based on the correlation matrix formed from a target group of the DBF resolution of FIG. 27B using the method described above. In FIG. 27B, the vertical axis indicates intensity of power spectrum, and the lateral axis indicates angles, in which the spectrum of FIG. 27B is further separated into the targets using the high resolution algorithm to obtain FIG. 27C. The term of "target group" is used for targets because there could be more than two or plural targets to be detected in the actual case.

Figure 28A:
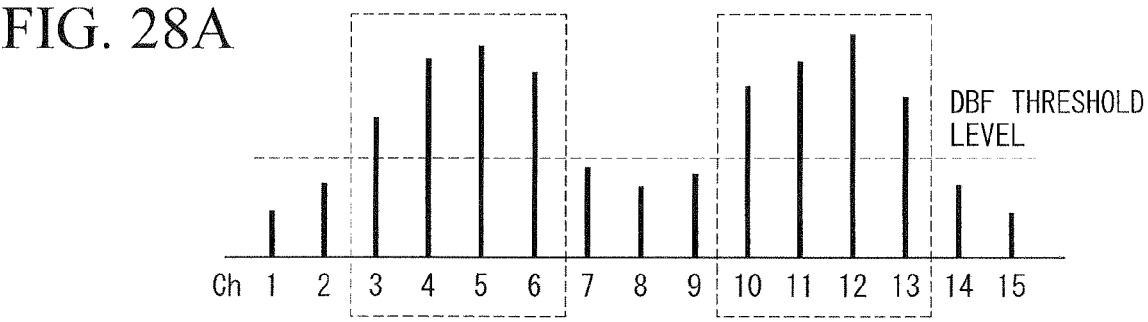
FIGS. 28A, 28B, and 28C are conceptual diagrams for describing data processing of intensities of spectra for respective angle-channels.
Figure 28B:
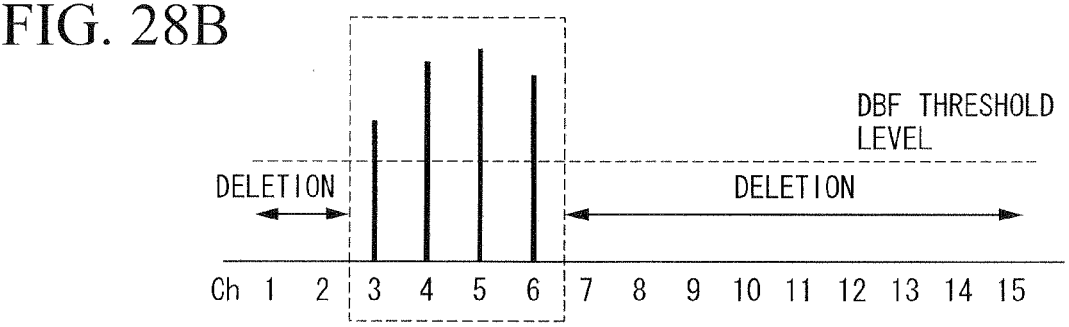
Figure 28C:
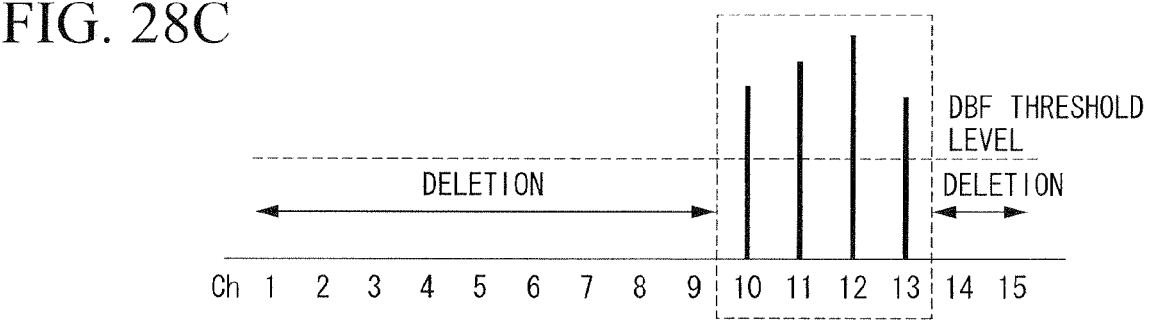

FIGS. 28A, 28B, and 28C are conceptual diagrams for use in describing data processing of intensities of spectra for each angle channel.

As shown in FIG. 28A, when the electronic scanning radar apparatus receives receiving waves with reflections from plural targets, the complex number data received from the DBF processing unit 40 will include a plurality of ranges of continuous angle channels where the intensity levels of the continuous angle channels exceed the DBF threshold level.

When the received complex number data include signal levels for adjacent continuous angle channels, and the signal levels of the adjacent continuous angle channels exceed the DBF threshold level within a predetermined range of angle channels, the Ch-deletion unit 41 extracts the signal levels from the predetermined range and replaces the rest of the signal levels at the rest of the range by "0". Thus, the Ch-deletion unit 41 separates and identifies the individual spatial complex number data for the ranges of angle channels, as shown in FIG. 28B and FIG. 28C.

The peak corresponding unit 27 obtains the distance, the relative velocity, the vertical position and the lateral position, and transmits them to the Ch-deletion unit 41 as well as to the target link unit 32, which is similar to the case of the sixth embodiment.

The Ch-deletion unit 41 selects the spatial complex number data corresponding to the frequency point of a DBF target.

After performing data deletion according to the method described above, the Ch-deletion unit 41 transmits the obtained data to the IDBF processing unit 42.

The IDBF processing unit 42 performs Inverse Spatial Fourier Transformation for the data received from the Ch-deletion unit 41. The IDBF processing unit 42 generates and transmits the IDBF data to the direction estimating unit 30.

The target link unit 32 extracts AR coefficients of the past detecting cycles from the table of FIG. 10 in the memory 21 in response to the receiving data such as the distance, the relative velocity, the vertical position and the lateral position, and transmits the obtained data to the direction estimating unit 30.

According to the data processing described above, the spectrum narrowing process can be made for the range of detecting direction when the spectra are calculated at the AR spectra estimation process of the direction estimating unit 30. This can further improve the resolutions.

Further, in the present embodiment, it becomes an equivalent case where the direction estimating unit 30 virtually receives a receiving wave divided by each target group for the correlation matrix used to calculate AR coefficients. Thereby, even if the receiving antennas and the sub-array receive incoming waves of targets more than the number of the receiving antenna and sub-array, it becomes possible to accurately calculate AR coefficients.

In the present embodiment, the table of FIG. 10 may store not only the AR coefficients, but also the complex number data obtained by the IDBF processing indicating the peak value of the beat frequency or the covariance matrix and the right hand side vector.

Eighth Embodiment

In the following, a description will be given of an estimation method using another data processing with reference to figures.

Figure 29:
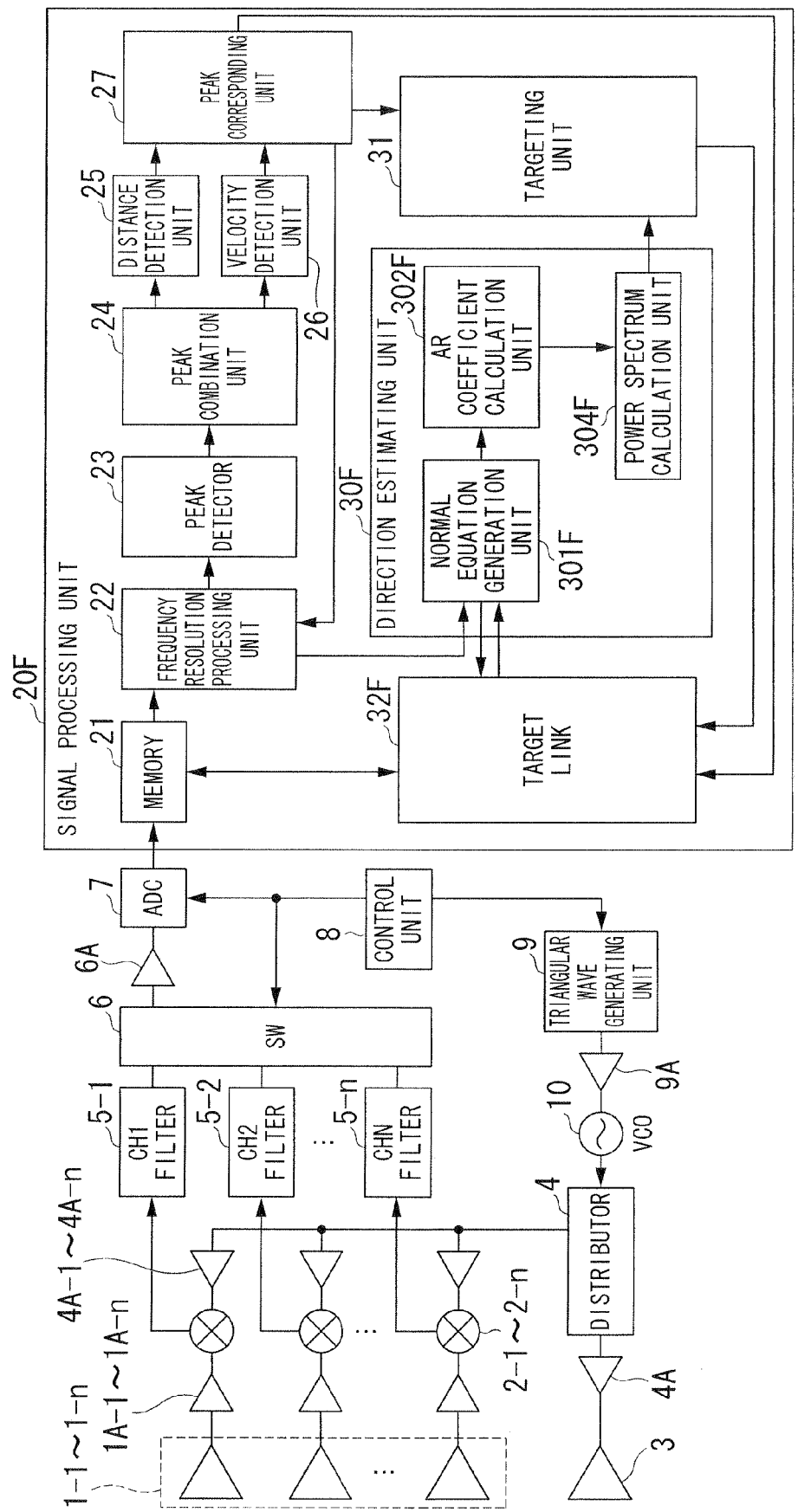
FIG. 29 is a block diagram of an electronic scanning radar apparatus in accordance with an eighth preferred embodiment of the present invention.

FIG. 29 is a block diagram of an electronic scanning radar apparatus in accordance with an eighth preferred embodiment of the present invention.

In the figure, the electronic scanning radar apparatus in accordance with the present embodiment includes different portions in a signal processing unit 20F compared to the electronic scanning radar apparatuses of FIG. 1 and FIG. 14.

In FIG. 29, for the parts which are identical to those used in FIG. 1 and FIG. 14, the identical symbols used in FIG. 1 and FIG. 14 are assigned.

The signal processing unit 20F includes a memory 21, a frequency resolution processing unit 22, a peak detector 23, a peak combination unit 24, a distance detection unit 25, a velocity detection unit 26, a peak corresponding unit 27, a direction estimating unit 30F, a targeting unit 31, and a target link unit 32F.

Further, the direction estimating unit 30F includes a normal equation generation unit 301A, an AR coefficient calculation unit 302F, and a power spectrum calculation unit 304F.

The signal processing unit 20F performs an averaging process for a normal equation.

The direction estimating unit 30F performs a spectral estimation process with a high resolution algorithm such as the AR spectral estimation method, a multiple signal classification method (MUSIC method), or the like. The direction estimating unit 30F detects the direction of a target based on past results of the spectral estimation and an averaged result of spectral estimation obtained by performing an averaging process, and transmits the obtained detection result to the targeting unit 31.

In the direction estimating unit 30F, the AR coefficient calculation unit 302F calculates AR coefficients (averaged AR coefficient) and a variance $\sigma^2$ of the white noise based on a normal equation which is obtained by the averaging process using the normal equation generation unit 301A.

In this way, the AR coefficient calculation unit 302F can perform the spectral estimation for each antenna in response to a detecting cycle. The spectral estimation is performed based on complex number data of a detected beat frequency which indicates the existence of a target.

The AR coefficient calculation unit 302F solves the normal equation obtained by the averaging process, and generates the present AR coefficients. Further, the AR coefficient calculation unit 302F transmits the obtained AR coefficients and the variance $\sigma^2$ of the white noise to the power spectrum calculation unit 304F.

The power spectrum calculation unit 304F calculates the direction of a receiving (incoming) wave from a power spectrum which is calculated based on the AR coefficients and the variance $\sigma^2$ of the white noise, in which the AR coefficients and the variance $\sigma^2$ of the white noise have been obtained from the averaged normal equation by the normal equation generation unit 301A.

FIG. 30 is a conceptual diagram that illustrates a data table which information is stored and retained in accordance with the present embodiment of the present invention.

The table of FIG. 30 indicates less columns compared to that of FIG. 15, in which the columns of the AR coefficients of FIG. 15 are eliminated, while the items in the rows of the table are identical to those of FIG. 15.

Figure 31:
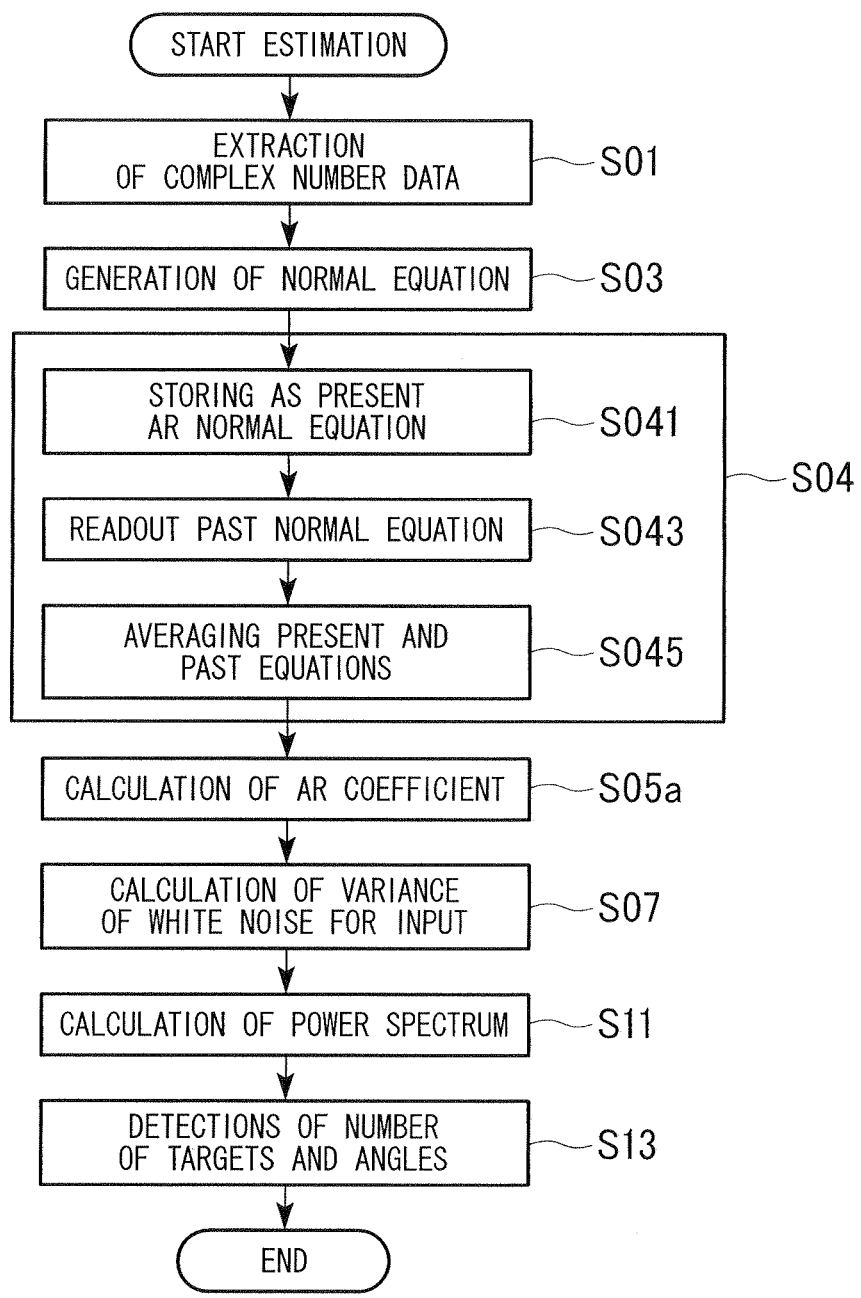
FIG. 31 is a flowchart illustrating data processing of a target direction estimation process in the electronic scanning radar apparatus in accordance with the eighth preferred embodiment of the present invention.

FIG. 31 is a flowchart illustrating data processing of the target direction estimation process in the electronic scanning radar apparatus in accordance with the present embodiment.

The flowchart shown in FIG. 31 includes different portions from that of FIG. 16. The flowchart of FIG. 31 omits the step S09 of FIG. 16. For process steps in the flowchart which are identical to those of FIG. 16, identical symbols are assigned.

The power spectrum calculation unit 304F obtains a power spectrum after step S07 indicated in FIG. 31. The power spectrum is obtained based on the AR coefficients and the variance of white noise which are calculated by solving the averaged normal equation.

A peak characteristic is detected from the obtained power spectrum, which corresponds to a pole of a transfer function (step S11). The transfer characteristics are expressed by the transfer function.

An angle indicated by the peak is detected as a receiving angle of a reflection wave (step S13).

In the data process described above, the obtained AR coefficients relates the characteristics of the power spectrum to be obtained, and reflects the accuracy of the peak shape. Therefore, when the accuracy of AR coefficient estimation is improved, the detecting performance (such as detecting performance of angles or separating performance) is improved.

(Direction Estimating Characteristics in the Present Embodiment)

In the following, a description will be given of the direction estimating characteristics of the electronic scanning radar apparatus in accordance with the present embodiment.

FIGS. 32A, 32B, 33A, and 33B are drawings that illustrate the direction estimating characteristics of the electronic scanning radar apparatus in accordance with the present embodiment.

Figure 32A:
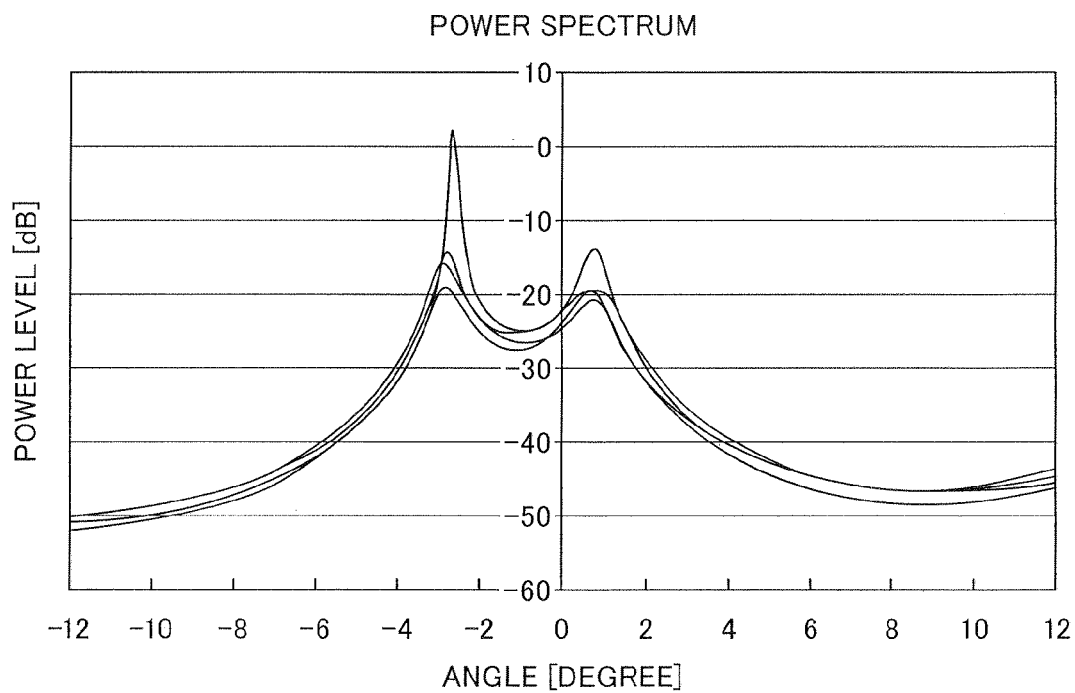
FIG. 32A and FIG. 32B are power spectra that show characteristics of the electronic scanning radar apparatus in accordance with the first preferred embodiment and the third preferred embodiment.
Figure 32B:
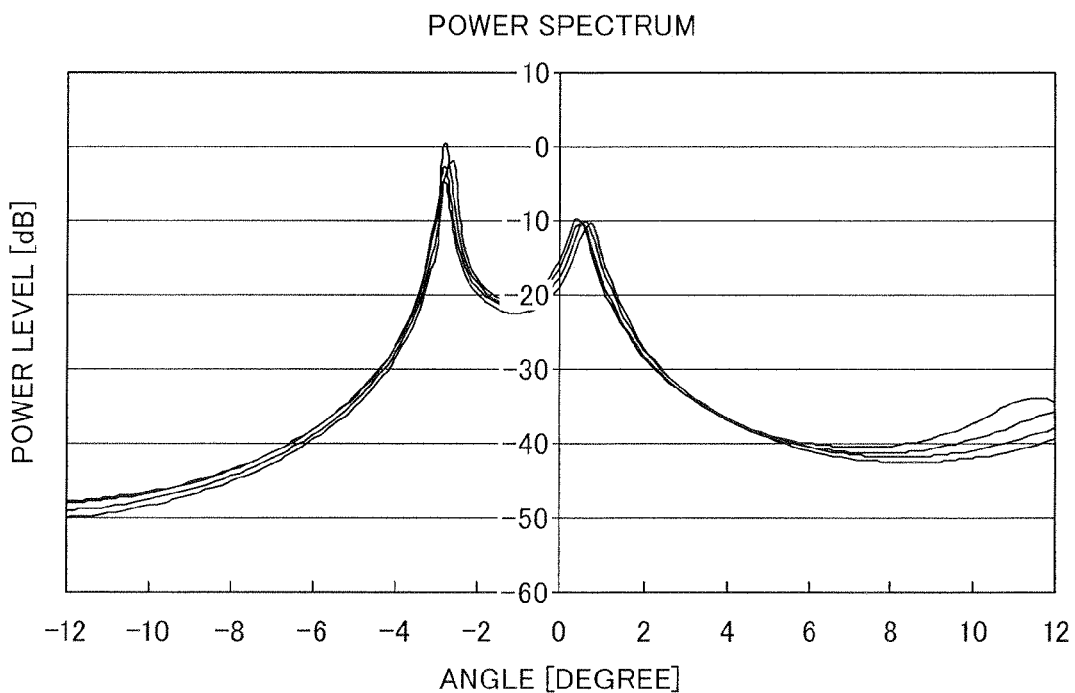
Figure 33A:
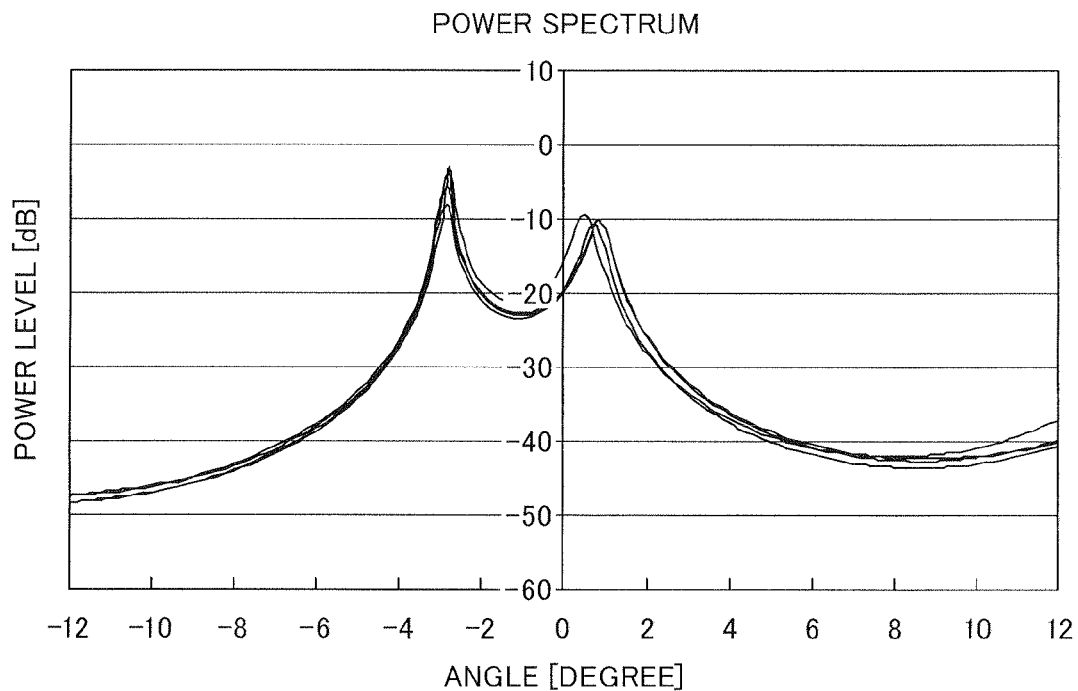
FIG. 33A is power spectra that shows characteristics of the electronic scanning radar apparatus in accordance with the eighth preferred embodiment.
Figure 33B:
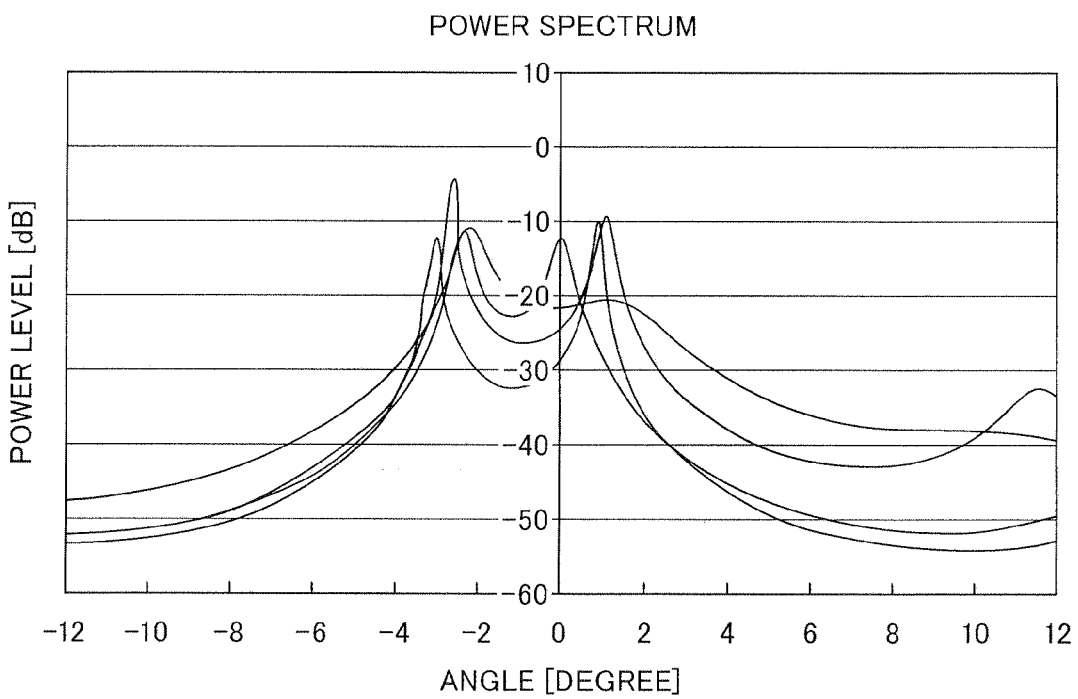
FIG. 33B shows estimation results which are obtained without performing an averaging processes for AR coefficients and normal equations.

FIG. 32A shows power spectra that show characteristics of the electronic scanning radar apparatus in accordance with the first preferred embodiment. FIG. 32B shows power spectra that show characteristics of the electronic scanning radar apparatus in accordance with the third preferred embodiment. FIG. 33A shows power spectra that show characteristics of the electronic scanning radar apparatus in accordance with the eighth preferred embodiment. FIG. 33B shows an estimation result that is obtained without performing averaging processes of AR coefficients and normal equations.

In FIG. 33B, it is seen that the obtained peak angles of individual power spectra fluctuate at different angles.

FIGS. 32A, 32B, and 33A are estimation results obtained by applying one of the averaging processes of AR coefficients and normal equations. FIG. 32A shows a direction estimation result obtained based on the averaging process of AR coefficients. FIG. 32B shows a direction estimation result obtained based on the averaging processes of AR coefficients and the normal equations. FIG. 33A shows a direction estimation result obtained based on the averaging process of AR coefficients. It can be seen that fluctuations of the peak angles are minimized for FIGS. 32A, 32B and 33A compared to the spectra of FIG. 33B. This indicates that applying the averaging process for the AR coefficients or applying normal equations according to the present embodiment and the embodiments described above can minimize fluctuations of the peak shapes of power spectra and the detected peak angles.

The electronic scanning radar apparatus in accordance with the present embodiment can perform the averaging process for input elements of the spectral estimation process or for output elements of the spectral estimation process, or perform for both the input elements and the output elements of the spectral estimation process based on the complex number data indicating the detected beat frequency at the direction estimating unit 30. Thereby, the electronic scanning radar apparatus can detect the direction of a receiving wave with high accuracy without degrading the detecting accuracy.

As described above, the descriptions of the first through eighth embodiments of the present invention have been made for FMCW type radars using FIG. 1, these embodiments can be applied to other type FMCW radars which use other types of antennas.

Further, the present invention can be applied to other types of radars such as multiple continuous wave CW radars, pulse radars or the like.

In a case where the transmitted and received data shown in FIG. 2A are taken for plural times in an identical control cycle, the averaging process in accordance with the present invention can be simply increased, so that further improvement on the estimation accuracy can be made.

In the present embodiment, the data processing is explained as examples, in which a direction is obtained by calculating peaks of a power spectrum. In stead of obtaining the power spectrum, the direction may be estimated based on a pole obtained by a calculation for solving a high order equation.

Further, while the present embodiment has described the AR spectral estimation process as an example of a high resolution algorithm of the direction estimating unit, the present embodiment can be applied to other estimating algorithms.

For example, for an algorithm which performs an eigenvalue calculation such as MUSIC, ESPRIT (Estimation of Signal Parameters via Rotational Invariance Techniques) or the like, it stores the elements of the calculated eigenvalues in a memory and performs the averaging process, which is similar to the way in which AR coefficients are stored for the averaging process.

Further, the correlation matrixes may be performed by the averaging process to obtain significant effects to improve the accuracy of the detection. For example, the normal equation generation unit may generate an averaged correlation matrix based on the weighted averaging process which is performed for a present correlation matrix and for past correlation matrixes. The normal equation generation unit may generate an averaged right hand side vector based on the weighted averaging process, which is performed for a present right hand vector and past right hand vectors. In this case the present correlation matrix and the present right hand vector are associated with the target.

Further, a receiving wave direction estimation program may be recorded into computer readable recording media to achieve the functions of control units 20, 20A through 20F in FIGS. 1, 14, 18, 21, 24, 26, and 29. The programs recorded in the media may be read by a computer system and be performed. Thereby, the direction estimation may be performed based on receiving waves.

The correlation matrixes may be performed by the averaging process to obtain significant effects of improving the accuracy of the detection.

In this case, the "computer system" may include an operation system and hardware such as a peripheral apparatus or the like. The "computer system" may include a system which can display home pages (or the like) and www ('world wide web') networks.

The "computer readable recording media" may include a flexible disk, an optical magnetic disk, ROM, CD-ROM or the like, and a hard drive installed in the computer system. Further, the "computer readable recording media" may include an apparatus such as a server or a volatile memory (RAM or the like) installed in the computer system, which can temporarily store the programs.

Further, the programs described above may be transmitted from a storage device or the like included in the computer system to another computer system via transmission media or a transmission wave in the transmission media.

The "transmission media," which transmits the programs, include a medium which has a function capable of transmitting information, similar to networks such as the internet or the like, and communication lines such as telephone lines or the like. The communication network may include wireless networks.

The programs described above may be able to achieve part of the function described above. Further, the functions described above may be used by combination with programs which are already installed in the computer system, i.e., the programs may be differential files or differential programs.

As used herein, the following directional terms "forward, rearward, above, downward, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, a section or a part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic scanning radar apparatus, which is installable in a moving body, the electronic scanning radar apparatus comprising:
   a transmission unit configured to transmit a transmission wave;
   a receiving unit including a plurality of antennas receiving an incoming wave coming from a present target, the incoming wave being formed from a reflection wave of the transmission wave reflected at the present target;
   a beat signal generation unit configured to generate beat signals in response to the transmission wave and the incoming wave;
   a frequency resolution processing unit configured to obtain complex number data calculated from beat frequencies having signal levels obtained by performing a frequency resolution for the beat signals based on a predetermined frequency width;
   a peak detector configured to detect an existence of the present target by detecting peak signal levels of the beat frequencies;
   a target link unit associating between the present target detected in a present detecting cycle and a past target detected in past detecting cycles; and
   a direction detecting unit configured to perform a spectral estimation based on the complex number data of the beat frequencies indicating an existence of a target, each of the beat frequencies being obtained from each of the antennas in the present detecting cycle, the direction detecting unit performing a weighted averaging process for complex number elements of a present normal equation and past normal equations, the present normal equation being obtained from a present result of the spectral estimation in the present detecting cycle, the past normal equations being obtained from past results of the spectral estimation in the past detecting cycles, the direction detecting unit calculating a direction of the incoming wave based on the weighted averaging process.

2. The electronic scanning radar apparatus according to claim 1,
   wherein the direction detecting unit comprises
   a normal equation generation unit configured to generate each of the present and past normal equations based on a correlation matrix and a right hand side vector led from the complex number data,
   the direction detecting unit including the present and past normal equations,
   each of the present and past normal equations is expressed by a linear equation form, each of the present and past normal equations having complex number elements of the correlation matrix, an AR coefficient, and the right hand side vector;
   an AR coefficient calculation unit configured to calculate the AR coefficient based on each of the present and past normal equations; and
   a spectrum calculation unit configured to calculate a direction of the incoming wave based on a power spectrum calculated from the AR coefficient, wherein an averaging process is performed for at least a part of the elements of each of the normal equations.

3. The electronic scanning radar apparatus according to claim 1,
wherein the direction detecting unit comprises
a filter unit configured to generate an averaged AR coefficient based on a weighted averaging process performing for a present AR coefficient and past AR coefficients, the present AR coefficient being calculated from the present normal equation in the present detecting cycle, the past AR coefficients being calculated from the past normal equations in the past detecting cycles, the present AR coefficient being associated with the present target, the past AR coefficients being associated with the past target, and
the spectrum calculation unit calculates a direction of the incoming wave based on the power spectrum obtained from the averaged AR coefficient.

4. The electronic scanning radar apparatus according to claim 1, further comprising
a storage unit,
wherein the direction detecting unit is configured to store, in the storage unit, present complex number data or the complex number elements of the present normal equation obtained based on the spectral estimation in the present detecting cycle or the direction detecting unit stores both of the present complex number data and the complex number elements of the present normal equation.

5. The electronic scanning radar apparatus according to claim 4, wherein the complex number elements of the past normal equations to be stored in the storage unit correspond to either the past AR coefficients or the past averaged AR coefficient.

6. The electronic scanning radar apparatus according to claim 1,
wherein the normal equation generation unit configured to generate an averaged correlation matrix based on the weighted averaging process performed for a present correlation matrix and past correlation matrixes, and generates an averaged right hand side vector based on the weighted averaging process performed for a present right hand vector and past right hand vectors, the present correlation matrix and the present right hand vector are associated with the present target, and the past correlation matrixes and the past right hand vectors are associated with the past target,
the AR coefficient calculation unit calculates the AR coefficient from the normal equation having the elements including the averaged correlation matrix and the averaged right hand side vector.

7. The electronic scanning radar apparatus according to claim 4,
wherein the complex number elements of the past normal equations to be stored in the storage unit correspond to the past correlation matrixes and past right hand side vectors associated with the past target.

8. The electronic scanning radar apparatus according to claim 1,
wherein the target link unit detects whether or not each of a present distance and a present relative velocity of the present target obtained from the beat frequency in the present detecting cycle is included in ranges estimated based on a past distance and a past relative velocity of the past target obtained in the past detecting cycles so that the target link unit determines whether or not the present target associates with the past target.

9. The electronic scanning radar apparatus according to claim 4,
wherein the storage unit stores, in the storage unit, a distance of the present target and a relative velocity of the present target detected in the present detecting cycle by associating with at least one of the present AR coefficient and the present averaged AR coefficient,
the filter unit performs the weighted averaging process for the present AR coefficient and the past AR coefficients, and generates the averaged AR coefficient,
the target link unit associates between the present target and the past target in a plurality of the past detecting cycles for time series, the target link unit performs an association between the present distance and the present relative velocity of the present target and the past distance and the past relative velocity of the past target, the target link unit performs another association between at least one of the present AR coefficient and the present averaged AR coefficient in the present detecting cycle and at least one of the past AR coefficients and the past averaged AR coefficient in the past detecting cycles, the target link unit stores the associations in the storage unit.

10. The electronic scanning radar apparatus according to claim 4,
wherein the storage unit stores the complex number data of beat frequencies for one or more detecting cycles by associating with detecting cycles,
when the target link unit detects the present target associating with the past target, a normal equation generation unit calculates past covariance matrixes and past right hand side vectors from the complex number data in the past detecting cycles, the target link unit associates between the present target and the past target in the past detecting cycles for time series, and the normal equation generation unit performs the weighted averaging process for the present covariance matrix and past covariance matrixes, the normal equation generation unit generates weighted average covariance matrixes associated with the present and past targets in the present and past detecting cycles, the normal equation generation unit generates weighted average right hand side vectors associated with the present and past targets in the present and past detecting cycles,
the target link unit stores the present distance, the present relative velocity, and the complex number data of the present target by associating with the past distance and the past relative velocity and the complex number data of the past target in the past detecting cycles.

11. The electronic scanning radar apparatus according to claim 1, further comprising
a digital beam forming unit detecting the existence of the present target and a present direction of the present target based on a digital beam forming method using the complex number data,
wherein the peak detector unit detects the present direction of the present target by performing the digital beam forming method for the beat frequencies in the present detecting cycle,
the target link unit performs an association between the present distance of the present target, the present relative velocity and a present direction of the present target in the present detecting cycle and the past distance, the past relative velocity and a past direction of the past target in the past detecting cycles.

12. The electronic scanning radar apparatus according to claim 11, wherein the digital beam forming unit further comprising:

a channel deletion unit configured to calculate present spatial complex number data indicating spectrum intensities for respective angle channels corresponding to the predetermined direction preset based on the digital beam forming method, when the spectrum intensities of adjacent angle channels within a predetermined range of the angle channels exceed a predetermined threshold level, the channel deletion unit detects the existence of the target, the channel deletion unit replaces the spectrum intensities of the rest of the angle channels having the intensities less than the predetermined threshold level by a level zero, and the channel deleting unit forms the spectrum intensities as adjusted spatial complex number data;

an inverse digital beam forming unit configured to perform an inverse digital beam forming process for the adjusted spatial complex number data to generate present renewed complex number data, wherein the normal equation generation unit obtains a present correlation matrix based on the present renewed complex number data and generates a normal equation.

13. The electronic scanning radar apparatus according to claim 11, wherein when the channel deletion unit detects plural targets, the channel deletion unit divides a spectrum of the plural targets into channel ranges for each of the targets and generates plural adjusted spatial complex number data for the plural targets, the inverse digital beam forming unit performs the inverse digital beam forming process for the plural adjusted spatial data and generates present renewed complex number data for each of the targets, the normal equation generation unit calculates a present correlation matrix of each of the targets based on the renewed complex number data for each of the targets.

14. The electronic scanning radar apparatus according to claim 3, wherein the filter unit varies weighted numbers of the weighted averaging process for each of the targets in response to the present relative velocity and the past relative velocity.

15. The electronic scanning radar apparatus according to claim 3, wherein the filter unit varies weighted numbers of the weighted averaging process for each of the present and past targets when a variation of a lateral position obtained from the present and past directions and the present and past distances exceeds a predetermined lateral value.

16. The electronic scanning radar apparatus according to claim 3, wherein the target link unit varies, in response to the present and past relative velocities, a number of the past detecting cycles for referring to information on the past detecting cycles when the target link unit performs the averaging process for the AR coefficients.

17. A receiving wave direction estimating method, the method comprising:

transmitting a transmission wave;

receiving an incoming wave by a plurality of antennas, the incoming wave being formed by a reflection of the transmission wave reflected by the target;

forming a beat signal from the transmission wave and the incoming wave;

associating between a target detected in a present detecting cycle and the target detected in past detecting cycles;

estimating a spectrum based on the complex number data of the beat frequencies indicating a detection of the existence of the target for each of the antennas in each of the detecting cycles;

a normal equation being obtained from a present result of the estimation in the present detecting cycle and past results of the estimation in the past detecting cycles; and calculating a direction of the incoming wave by performing a weighted averaging process for elements of the normal equation.

18. A non-transitory computer-readable storage media storing a receiving wave direction estimation program for causing a computer to control an electronic scanning radar apparatus, which is installable in a moving body, the receiving wave direction estimation program comprising:

transmitting a transmission wave;

receiving an incoming wave by a plurality of antennas, the incoming wave being formed by a reflection of the transmission wave reflected by the target;

forming a beat signal from the transmission wave and the incoming wave;

calculating complex number data from beat frequencies obtained by performing a frequency resolution for the beat signal with a predetermined frequency width;

detecting an existence of the target by detecting peak signal levels of the beat frequencies;

associating between a target detected in a present detecting cycle and the target detected in past detecting cycles;

estimating a spectrum based on the complex number data of the beat frequencies indicating a detection of the existence of the target for each of the antennas in each of the detecting cycles;

a normal equation being obtained from a present result of the estimation in the present detecting cycle and past results of the estimation in the past detecting cycles; and calculating a direction of the incoming wave by performing a weighted averaging process for elements of the normal equation.

* * * * *